(12) United States Patent
Kajiyama et al.

(10) Patent No.: US 10,557,929 B2
(45) Date of Patent: Feb. 11, 2020

(54) WIND MEASUREMENT APPARATUS AND LIDAR APPARATUS

(71) Applicant: Mitsubishi Electric Corporation, Chiyoda-ku (JP)

(72) Inventors: Yutaka Kajiyama, Chiyoda-ku (JP); Yoshiyuki Yabugaki, Chiyoda-ku (JP); Masayuki Enjo, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/099,517

(22) PCT Filed: Jun. 27, 2016

(86) PCT No.: PCT/JP2016/068951
§ 371 (c)(1),
(2) Date: Nov. 7, 2018

(87) PCT Pub. No.: WO2018/002980
PCT Pub. Date: Jan. 4, 2018

(65) Prior Publication Data
US 2019/0107609 A1    Apr. 11, 2019

(51) Int. Cl.
*G01S 7/497* (2006.01)
*G01S 17/58* (2006.01)
(Continued)

(52) U.S. Cl.
CPC ............... *G01S 7/497* (2013.01); *G01P 5/26* (2013.01); *G01S 7/4813* (2013.01); *G01S 17/58* (2013.01);
(Continued)

(58) Field of Classification Search
CPC ........ G01S 17/58; G01S 7/4813; G01S 7/497; G01S 17/95; G01S 2007/4977; G01P 5/26; Y02A 90/19
(Continued)

(56) References Cited

U.S. PATENT DOCUMENTS

| 2008/0210881 A1 | 9/2008 | Harris et al. |
| 2014/0270379 A1 | 9/2014 | Snider |
| 2015/0094908 A1 | 4/2015 | Hirota et al. |

FOREIGN PATENT DOCUMENTS

| JP | 05-014961 U | 2/1993 |
| JP | 2009-503486 A | 1/2009 |

(Continued)

OTHER PUBLICATIONS

Office Action dated Aug. 7, 2018 in corresponding Japanese Application No. 2018-524592, along with an English translation.
(Continued)

*Primary Examiner* — Daniel L Murphy
(74) *Attorney, Agent, or Firm* — Oblon, McClelland, Maier & Neustadt, L.L.P.

(57) ABSTRACT

A lidar apparatus includes a foreign matter detector detecting foreign matter hindering laser light and reflected light from passing through the light transmission window, based on at least one of the measurement success or failure result and the signal-to-noise ratio; a precipitation determiner determining whether precipitation, included in the foreign matter, exists on the external surface of the light transmission window based on a time elapsed since the latest wiper operation, when the foreign matter detector detects the foreign matter, and that the precipitation does not exist, when the foreign matter detector does not detect the foreign matter. When the precipitation determiner determines that precipitation exists, the wiper operation controller causes the wiper to operate and the washer fluid supplier not to operate.

(Continued)

When the precipitation determiner does not determine that precipitation exists while the foreign matter detector detects that foreign matter exists, the wiper operation controller causes the washer fluid supplier and the wiper to operate.

20 Claims, 21 Drawing Sheets

(51) Int. Cl.
      *G01S 17/95*       (2006.01)
      *G01S 7/481*       (2006.01)
      *G01P 5/26*       (2006.01)

(52) U.S. Cl.
    CPC ....... *G01S 17/95* (2013.01); *G01S 2007/4977* (2013.01); *Y02A 90/19* (2018.01)

(58) Field of Classification Search
    USPC ........................................................ 356/5.01
    See application file for complete search history.

(56) References Cited

FOREIGN PATENT DOCUMENTS

| | | |
|---|---|---|
| JP | 2011-194361 A | 10/2011 |
| JP | 2011-237322 A | 11/2011 |
| JP | 2015-068805 A | 4/2015 |

OTHER PUBLICATIONS

Decision to Grant dated Dec. 4, 2018 in corresponding Japanese Application No. 2018-524592, along with an English translation.
International Search Report dated Sep. 13, 2016 in PCT/JP2016/068951 filed Jun. 27, 2016.
European Search Report dated Jan. 4, 2018 in Patent Application No. 16871786.6 filed Jun. 27, 2016.
Office Action dated Nov. 23, 2018 in counterpart European Application No. 16871786.6 (6 pgs.).
European Search Report dated Jan. 4, 2018 in PCT/JP2016/068951 filed Jun. 27, 2016.

WIND MEASUREMENT APPARATUS AND LIDAR APPARATUS

TECHNICAL FIELD

The present disclosure relates to a lidar apparatus to be installed outdoors.

BACKGROUND ART

A radar apparatus is known generally as an apparatus for measuring positional information or the like of a remotely located object. The radar apparatus emits waves such as electromagnetic waves or acoustic waves into the space, receives the waves reflected from a target, and analyzes the received signals. In this way, the radar apparatus measures the distance from the radar apparatus to the target or the angle of the target relative to the radar apparatus. One such radar apparatus is a meteorological radar apparatus whose targets are solid particles (aerosols) floating in the atmosphere. This meteorological radar apparatus measures the moving velocity of the aerosols, namely "wind velocity," from the amount of phase rotation or frequency shift of the waves reflected from the particles.

Among the meteorological radar apparatuses, a laser radar apparatus (lidar apparatus) which uses light as electromagnetic waves to be emitted is known. The lidar apparatus emits an extremely narrow beam and can observe a target with a high angular resolution. The lidar apparatus is therefore also used as an anemometer for measuring the wind direction and the wind speed. In order to measure a wind velocity vector representing a wind direction and a wind speed, generally the VAD (Velocity Azimuth Display) method or vector operation method is used as a method for calculating the wind velocity vector. According to the VAD method, a laser light is emitted in multiple directions, and the line-of-sight velocity representing the value of the wind speed in a line-of-sight direction, which is the direction in which a laser light is emitted, is measured.

In the case where the lidar apparatus is used for measuring a wind velocity vector, the lidar apparatus is installed generally outdoors. When it is intended to measure a horizontal distribution of wind velocity vectors each representing a wind velocity at a distance from the lidar apparatus, it is necessary to emit the laser light horizontally from the lidar apparatus. When it is intended to measure a vertical distribution of wind velocity vectors, it is necessary to emit the laser light vertically. A particular problem with the measurement of the vertical distribution of wind velocity vectors at different altitudes is caused by "precipitation." During precipitation, aerosols are present and therefore the wind velocity vectors can be measured. The laser light is emitted in the vertical direction and accordingly the lens surface of a scanner emitting the laser light is also oriented vertically. Due to this, water droplets stay on the lens surface. A resultant phenomenon is that the intensity of the emitted laser light is attenuated by the water droplets and the SN ratio (Signal-to-Noise ratio) is lowered. The observable altitude is therefore lowered. In other words, the data acquisition ratio is lowered.

When lowering of the SN ratio is detected at least a part of the lens surface, a conventional lidar apparatus for measuring a vertical distribution of wind is configured to spray a washer fluid from a washer fluid tank of the lidar apparatus onto the lens surface, and to drive a wiper to wipe the lens surface (see for example Patent Document 1).

CITATION LIST

Patent Document

Patent Document 1: Japanese National Patent Publication No. 2009-503486

SUMMARY OF INVENTION

Technical Problem

It is difficult to determine accurately whether the lowering of the SN ratio is due to precipitation or adhesion of foreign matter such as dust to the lens surface. Therefore, the conventional lidar apparatus invariably sprays the washer fluid and actuates the wiper. A resultant problem with the conventional lidar apparatus is thus a large amount of the washer fluid is consumed when precipitation falls. In some cases, all the washer fluid is consumed in one day as the shortest period. There is a problem that, in the case where the lidar apparatus is installed in an environment where a user cannot supply the washer fluid easily (installed on a float on the sea or the like, for example), the washer fluid is consumed rapidly when rain falls and the wind velocity cannot be measured after the rainfall when all of the washer fluid is consumed.

An object of the present disclosure is to measure the wind velocity even when precipitation falls, by reducing the consumption of the washer fluid in the case of precipitation, as compared with the conventional apparatus.

Solution to Problem

A wind measurement apparatus according to the present disclosure includes: an optical device to emit a laser light into a space and to process a reflected light being the laser light reflected from the space; a casing to house the optical device; a light transmission window provided in the casing and to transmit the laser light and the reflected light; a wiper to remove foreign matter existing on an external surface of the light transmission window; and a washer fluid supplier to supply a washer fluid to the external surface of the light transmission window. The lidar apparatus further includes: a wind velocity measurer to measure a wind velocity vector in the space, from a received signal obtained by photoelectric conversion of the reflected light; a wind velocity storage to store a measurement success or failure result being an indicator representing whether or not the wind velocity vector is measured by the wind velocity measurer and the measured wind velocity vector; a signal-to-noise ratio calculator to calculate a signal-to-noise ratio of the received signal; a foreign matter detector to detect, based on at least one of the measurement success or failure result and the signal-to-noise ratio, that the foreign matter exists on the external surface of the light transmission window, the foreign matter hindering the laser light and the reflected light from passing through the light transmission window; a precipitation determiner to determine whether precipitation, included in the foreign matter, exists on the external surface of the light transmission window based on a time elapsed since the latest wiper operation, when the foreign matter detector detects the foreign matter, and that the precipitation does not exist, when the foreign matter detector does not detect the foreign matter; and a wiper operation controller to control the wiper and the washer fluid supplier. The wiper operation controller is configured to cause the wiper to operate and the washer fluid supplier not to operate, when the precipitation determiner determines that the precipitation exists, and to cause the washer fluid supplier and the wiper to operate, when the precipitation determiner does not determine that the precipitation exists and the foreign matter detector detects that the foreign matter exists.

Advantageous Effects of Invention

The wind measurement apparatus according to the present disclosure can reduce the consumption of the washer fluid in the case of precipitation as compared with the conventional apparatus and accordingly measure the wind velocity even when precipitation falls.

DESCRIPTION OF EMBODIMENTS

First Embodiment

Figure 1:
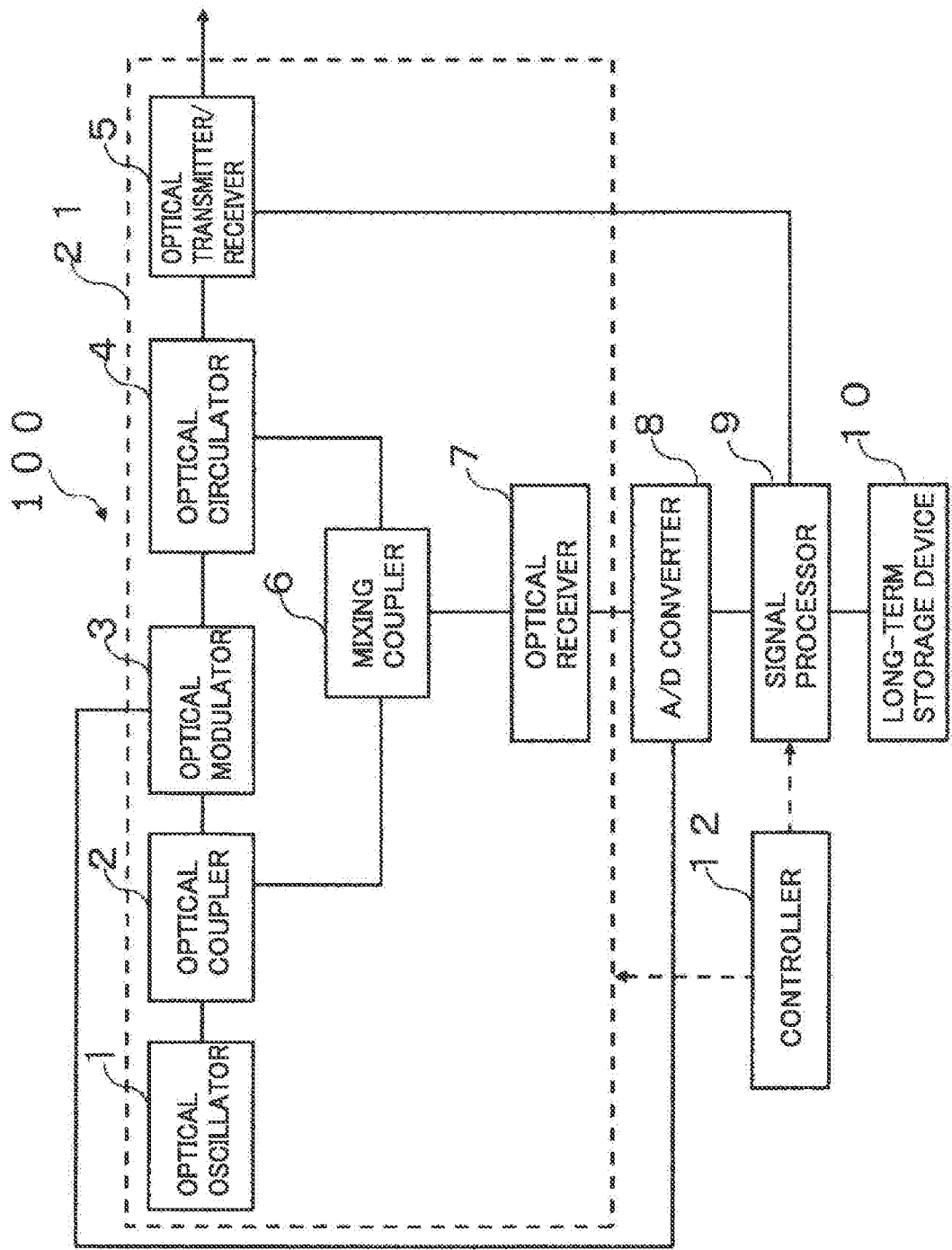
FIG. 1 is a block diagram illustrating a configuration involved in measurement of the wind velocity in a lidar apparatus according to a first embodiment of the present disclosure.

FIG. 1 is a block diagram illustrating a configuration involved in measurement of the wind velocity by a lidar apparatus according to a first embodiment of the present disclosure. Lidar apparatus 100 includes, as components for emitting a laser light into a space, an optical oscillator 1, an optical coupler 2, an optical modulator 3, an optical circulator 4, and an optical transmitter/receiver 5. Wind velocity measurement or wind measurement refers to measurement of the wind direction and the wind speed, namely wind velocity vector in this description. Lidar apparatus 100 is a wind measurement apparatus measuring a wind velocity vector in a space located in a predetermined positional relation with lidar apparatus 100.

Optical oscillator 1 generates and outputs a single-frequency continuous-wave laser light. The laser light from optical oscillator 1 is inputted to optical coupler 2. Optical coupler 2 splits the light emitted from optical oscillator 1 into two beams at a split ratio determined arbitrarily, and delivers the two beams. Of the two laser beams delivered by optical coupler 2, one is inputted to optical modulator 3 and the other is inputted to a mixing coupler 6.

Optical modulator 3 shifts the frequency of the laser light acquired from optical coupler 2 by the predetermined amount and modulates the laser light by applying optical frequency modulation or optical intensity modulation. The modulated laser light is a transmission laser light to be emitted into a space. Optical circulator 4 is a three-terminal device separating a path for the transmission laser light and a path for a received laser light. Optical circulator 4 switches the destination of the laser light depending on the source from which the laser light is inputted to optical circulator 4. Receiving the transmission laser light inputted from a terminal connected to optical modulator 3, optical circulator 4 outputs the transmission laser light to a terminal connected to optical transmitter/receiver 5. Receiving the received laser light inputted from optical transmitter/receiver 5, optical circulator 4 outputs the received laser light to a terminal connected to mixing coupler 6.

Optical transmitter/receiver 5 has a function of a signal transmitter/receiver, namely emits the transmission laser light from optical circulator 4 into the atmosphere in a predetermined direction with respect to lidar apparatus 100, and collects a reflected light which is the transmission laser light reflected by aerosols. The received laser light which is the reflected light collected by optical transmitter/receiver 5 is inputted to mixing coupler 6 through optical circulator 4.

Mixing coupler 6 mixes the laser light from optical coupler 2 and the received laser light sent from optical transmitter/receiver 5 through optical circulator 4. The laser lights mixed by mixing coupler 6 are inputted to an optical receiver 7.

Figure 4:
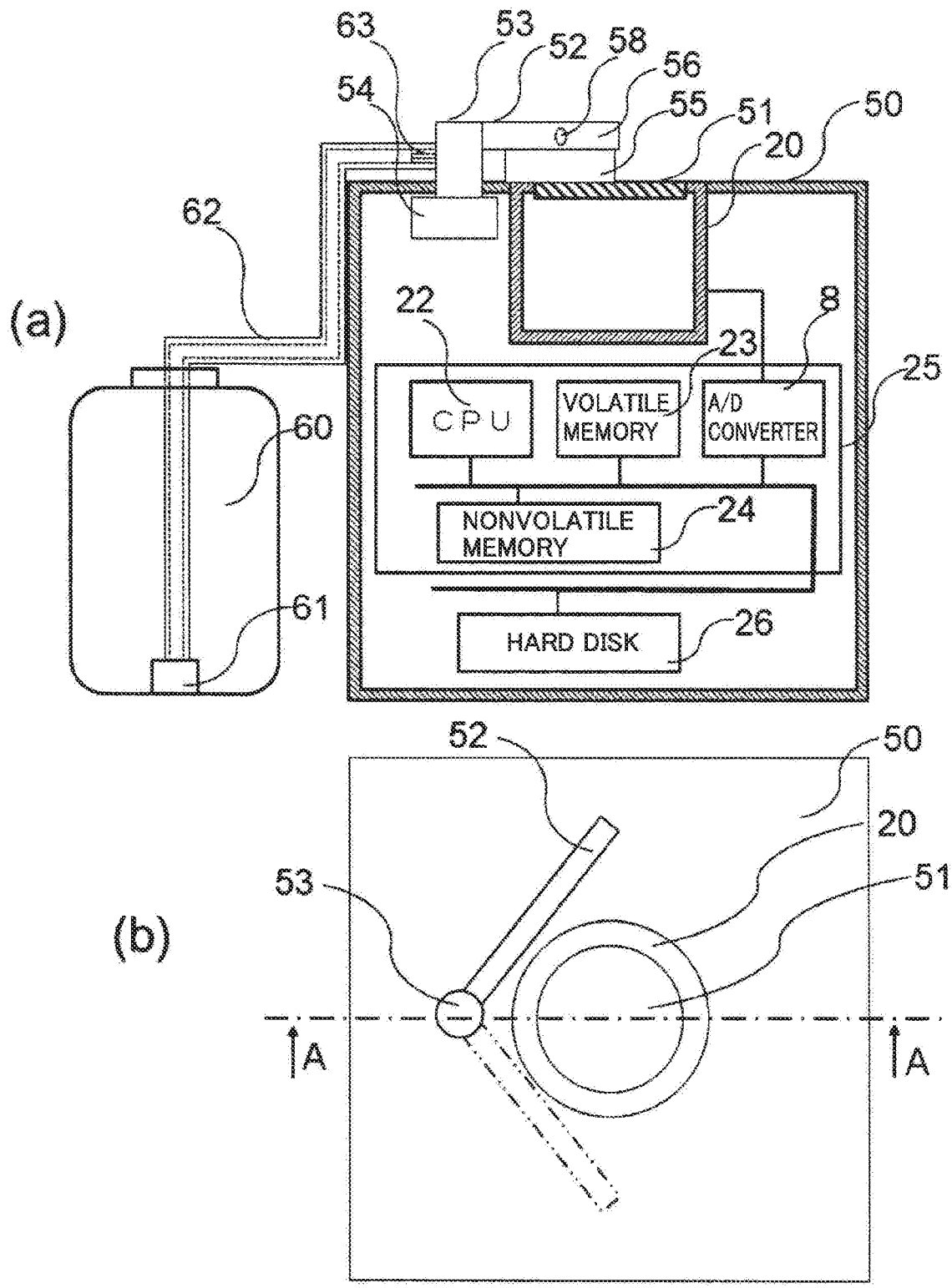
FIG. 4 shows a cross-sectional view and a top view illustrating a configuration for removing foreign matter existing on the external surface of a light transmission window of the lidar apparatus according to the first embodiment.

Optical oscillator 1, optical coupler 2, optical modulator 3, optical circulator 4, optical transmitter/receiver 5, mixing coupler 6, and optical receiver 7 are housed in an optical casing 20 (shown in FIG. 4). These devices housed in optical casing 20 constitute an optical device 21 emitting a laser light into a space and processing a reflected light which is the laser light reflected from the space. The laser light and the reflected light pass through a light transmission window 51 (shown in FIG. 4) provided in optical casing 20.

Lidar apparatus 100 includes, as devices which process the received laser light, optical receiver 7, an A/D converter 8, a signal processor 9, and a long-term storage device 10.

Optical receiver 7 extracts, by heterodyne detection, a low-frequency component from the laser light sent from mixing coupler 6, emits the light varying with the extracted low-frequency component to a photoelectric conversion device, and outputs an electrical signal generated by the photoelectric conversion. The received signal which is the electrical signal generated through the photoelectric conversion by optical receiver 7 is inputted to A/D converter 8. A/D converter 8 converts the received signal, which is an analog signal from optical receiver 7, into a digital signal, based on a timing signal for generating laser pulses outputted from optical modulator 3. The received signal converted by A/D converter 8 into the digital signal having a predetermined number of bits for each sampling timing with the predetermined sampling rate is inputted to signal processor 9.

Signal processor 9 is a wind velocity measurer determining a wind velocity vector in a space above lidar apparatus 100. In long-term storage device 10, a wind measurement record 31 is stored including a measurement success or failure result which represents whether or not a wind velocity vector is measured for each altitude, and the measured wind velocity vector. The stored data may be displayed on a display 11 (not shown). As to the measurement success or failure result, "success" means that the wind velocity vector is measured, and "failure" means that the wind velocity vector is not measured. When the measurement success or failure result is success, the measured wind velocity vector is stored in long-term storage device 10. Optical device 21, signal processor 9, and long-term storage device 10 are controlled by a controller 12.

Figure 2:
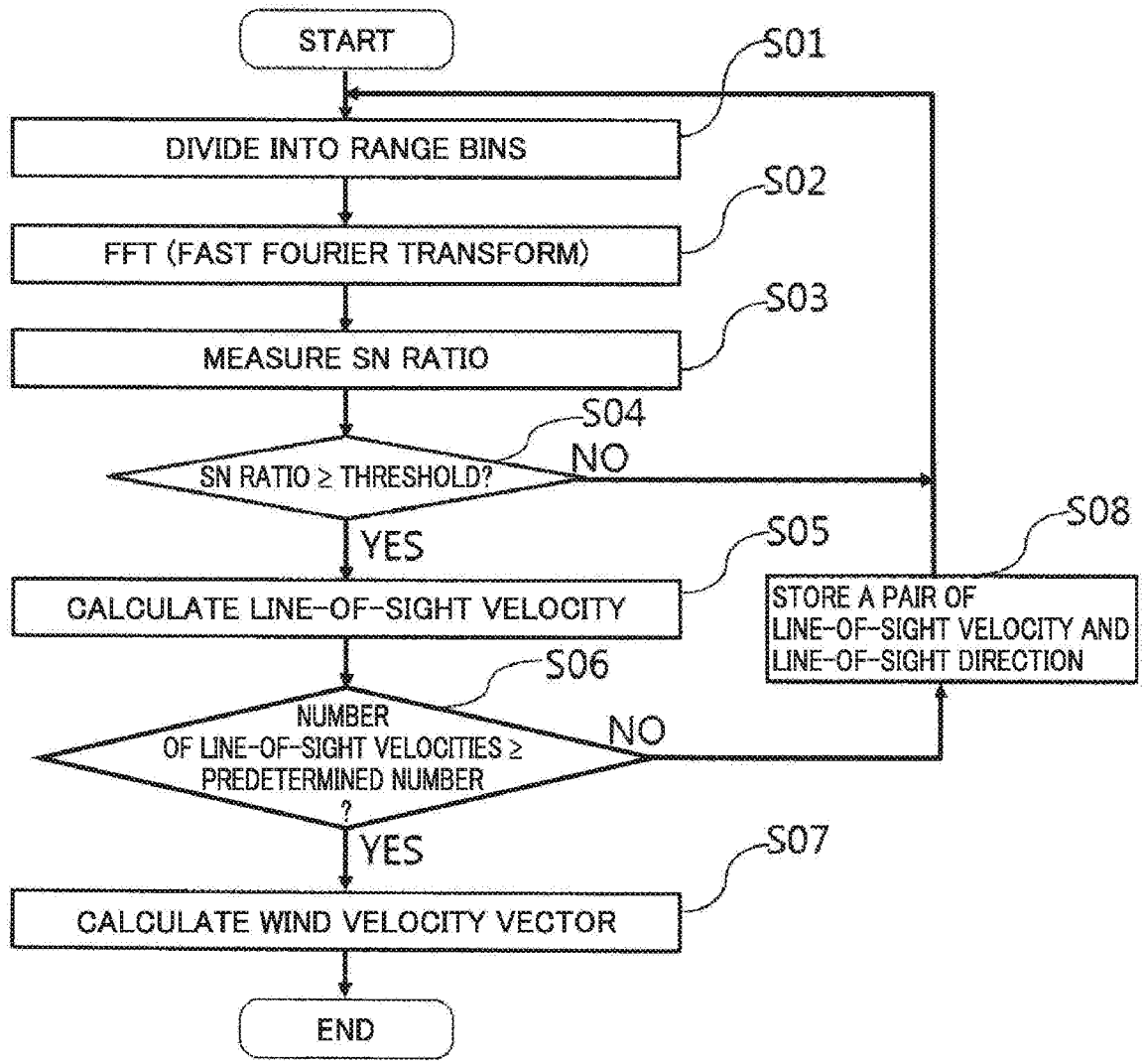
FIG. 2 is a flowchart illustrating a process procedure for calculating a wind velocity vector by the lidar apparatus according to the first embodiment.

FIG. 2 is a flowchart illustrating a process procedure for measuring a wind velocity vector by the lidar apparatus according to the first embodiment. In the step of dividing into range bins of step S01, the digitized received signal outputted from A/D converter 8 is divided into a plurality of range bins which are signals divided by time ranges corresponding to respective distances from lidar apparatus 100. Each range bin corresponds to an altitude at which the wind velocity vector is measured. Respective range bins are divided received signals into which the received signal is divided to correspond to a plurality of divided spaces into which the space is divided by distance from optical device 21. The range bin is also referred to as range.

In the FFT step of step S02, FFT (Fast Fourier Transform) is performed for each range bin to calculate a frequency spectrum. In the step of measuring an SN ratio of step S03, an SN ratio, namely signal-to-noise ratio, is measured from the frequency spectrum for each range bin. Signal processor 9 is a signal-to-noise ratio calculator calculating a signal-to-noise ratio of a received signal.

In step S04, it is checked whether or not the SN ratio is equal to or more than a predetermined threshold. When the SN ratio is equal to or more than the predetermined threshold (YES in S04), a line-of-sight velocity is calculated from a Doppler frequency shift, which is determined from the frequency spectrum, in the step of calculating a line-of-sight velocity of step S05. The line-of-sight velocity is a velocity (scalar value) obtained by projecting the wind velocity vector in a line-of-sight direction which is the direction in which the laser light is emitted.

In step S06, it is checked whether or not the number of the line-of-sight velocities reaches a predetermined number. When it reaches the predetermined number (YES in S06), a wind velocity vector is calculated in the step of calculating a wind velocity vector of step S07. Otherwise (NO in S07), a pair of the obtained line-of-sight velocity and the line-of-sight direction is stored in step S08. Then, the process returns to S01 to process a received signal in a subsequent line-of-sight direction.

A reason why the line-of-sight velocity is not measured when the SN ratio is less than the threshold is difficulty in determining the Doppler frequency shift precisely from the frequency spectrum if the SN ratio is small. The Doppler frequency shift and the line-of-sight velocity may be obtained when the SN ratio is small. It may be determined, when the obtained line-of-sight velocity has an abnormal value, that the wind velocity vector cannot be measured at the corresponding altitude.

When the SN ratio is lowered, the wind velocity vector cannot be measured from a range of the highest altitude. A reason for this is as follows. The laser light emitted from optical device 21 into a space and the laser light reflected from the space are attenuated in the space, and thus the intensity of the received signal is lowered. Therefore, the SN ratio of a received signal of a range of a higher altitude is lower than the SN ratio of a received signal of a range of a lower altitude. Accordingly, when the SN ratio of the received signal is lowered due to foreign matter existing on the external surface of light transmission window 51, the SN ratio of a received signal of a range of a higher altitude becomes smaller than the threshold earlier than the SN ratio of a received signal of a range of a lower altitude. The lowering of the SN ratio to be smaller than the threshold makes it impossible to measure the wind-velocity vector.

Lidar apparatus 100 measures the line-of-sight velocities in at least three line-of-sight directions to calculate the wind velocity vector. The line-of-sight directions are required to be set so as not to have one plane in which all the line-of-sight directions exist.

Figure 3:
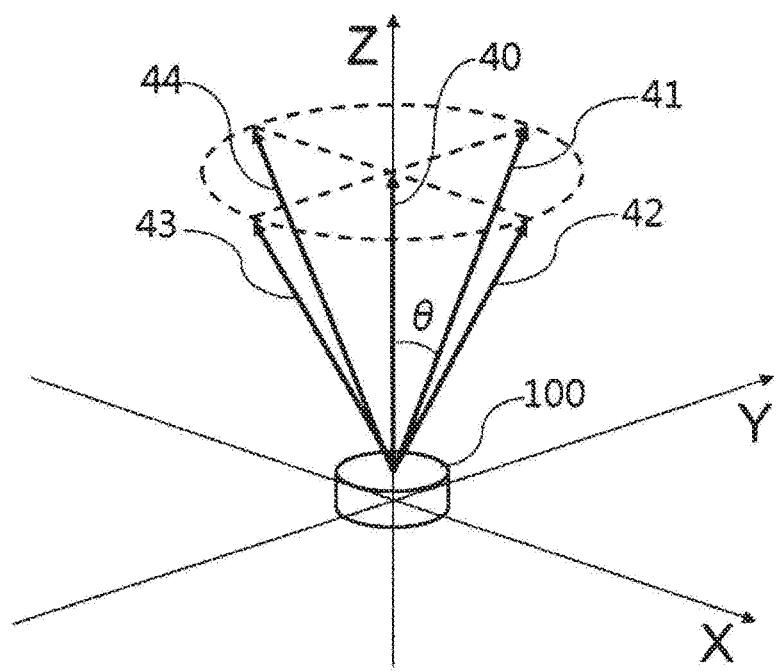
FIG. 3 is a diagram illustrating an example of beam directions used for determining a wind velocity vector by the lidar apparatus according to the first embodiment.

FIG. 3 is a diagram illustrating an example of beam directions used for determining a wind velocity vector by the lidar apparatus according to the first embodiment. Beam 0 having its direction represented by vector 40 is a beam emitted in the vertical direction. Beam 1 having its direction represented by vector 41 is a beam obtained by tilting Beam 0 northward by an angle (0 degrees, 30 degrees for example). Beam 2 having its direction represented by vector 42 is a beam obtained by tilting Beam 0 eastward by 0 degrees. Beam 3 having its direction represented by vector 43 is a beam obtained by tilting Beam 0 southward by 0 degrees. Beam 4 having its direction represented by vector 44 is a beam obtained by tilting Beam 0 westward by 0 degrees. FIG. 3 shows an example of beam directions used in the case where lidar apparatus 100 is installed on the ground and lidar apparatus 100 neither moves nor shakes. Lidar apparatus 100 is supposed to be installed with the X-axis oriented eastward, the Y-axis oriented northward, and the Z-axis oriented vertically upward. The laser lights, namely five beams from beam 0 to beam 4 as well as respective reflected lights pass through multiple different portions of light transmission window 51.

The line-of-sight velocities (scalar values) in respective beam directions (line-of-sight directions) measured by Beam 0, Beam 1, Beam 2, Beam 3, and Beam 4 are represented respectively by v0, v1, v2, v3, and v4. The wind velocity vector to be measured is represented by Vw=(Vx, Vy, Vz).

In the case where the beam directions shown in FIG. 3 are used, wind velocity vector Vw can be calculated in the following way. In the case where beam directions different from those in FIG. 3 are used as well, a calculation method adapted to the beam directions can be used to calculate the wind velocity vector.

$$Vx=(1/2)*(v2-v4)*\sin\theta$$

$$Vy=(1/2)*(v1-v3)*\sin\theta$$

$$Vz=(1/2)*v0+(1/8)*(V1+V2+V3+V4)*\cos\theta$$

In the case where the lidar apparatus is used to find a location suitable for offshore wind power generation, the lidar apparatus is mounted on a float floated on the sea or the like. A motion sensor for detecting motion of the float is installed on the float. The motion sensor is constituted for example of a gyro sensor detecting motion of the float, a GPS (Global Positioning System) outputting the position of the float, a magnetic compass outputting orientation information, or the like. The motion sensor acquires motion information about the float (position, orientation, three-axis attitude angles, attitude angular velocity, three-axis translational velocities, or the like). Receiving the motion information measured by the motion sensor, the lidar apparatus corrects the wind velocity vector based on the motion information, or calculates the wind velocity vector by correcting the line-of-sight direction based on the motion information.

FIG. 4 shows a cross-sectional view and a top view illustrating a configuration for removing foreign matter existing on the external surface of the light transmission window of the lidar apparatus according to the first embodiment. FIG. 4 (a) is the cross-sectional view and FIG. 4 (b) is the top view. The cross-sectional view of FIG. 4 (a) is along section A-A shown in FIG. 4 (b). A main body of lidar apparatus 100 includes a casing 50 which houses devices for measuring a wind velocity vector. The top surface of casing 50 includes a light transmission window 51 transmitting laser light and reflected light. Light transmission window 51 is provided in an optical casing 20 which is a casing to house the optical device. Casing 50 and optical casing 20 are combined so that optical casing 20 is exposed from the top surface of casing 50. Casing 50 and optical casing 20 are configured to have a required waterproof capability. Optical casing 20 and casing 50 may be integrated into one casing. In the case where lidar apparatus 100 is to be used in a cold district, lidar apparatus 100 is equipped with a heater for heating light transmission window 51. Light transmission window 51 is heated by the heater so as to prevent water droplets or snow on the external surface of light transmission window 51 from being frozen.

The external surface of casing 50 is equipped with a wiper 52 for removing foreign matter existing on the external surface of light transmission window 51. Wiper 52 is driven to reciprocate back and forth within a predetermined angular range around a rotational shaft 53. Rotational shaft 53 is disposed rotatably and perpendicularly to the top surface of casing 50. In casing 50, a drive mechanism 54 for driving rotational shaft 53 is disposed. Foreign matter is material such as water droplet, snow, sleet, dirt, dust, bird/insect feces, pollen, plant fragment such as fallen leaf, insect or its dead body, soil, sand, or the like. The presence of foreign matter on the external surface of light transmission window 51 hinders transmission of the laser light or reflected light through light transmission window 51 and causes lowering of the SN ratio of a received signal generated from reflected light.

Wiper 52 includes a blade 55 which is brought into contact with light transmission window 51 for moving and thereby removing foreign matter existing on the surface, and a frame 56 to which blade 55 is attached. Blade 55 is made from material having moderate elasticity such as rubber. Frame 56 is attached to rotational shaft 53. In rotational shaft 53 and frame 56, a washer fluid pipe 57 (not shown) allowing a washer fluid to pass through is disposed. Washer fluid pipe 57 has one or more washer fluid supply holes 58. While wiper 52 operates, wiper 52 can feed the washer fluid from washer fluid supply hole(s) 58. Washer fluid supply hole(s) 58 is/are arranged in a portion of washer fluid pipe 57 that passes over light transmission window 51. Washer fluid supply hole(s) 58 is/are shaped so that it/they can supply a predetermined quantity of the washer fluid per a predetermined time to the external surface of light transmission window 51. Blade 55 is driven to reciprocate back and forth by drive mechanism 54 so as to remove any foreign matter existing on light transmission window 51. Wiper 52 has a portion moving in contact with the external surface of light transmission window 51. The wiper may be any device as long as it can touch foreign matter, existing on the external surface of light transmission window 51, and move the foreign matter to any portion outside light transmission window 51.

The washer fluid is water or a liquid prepared from water and an additive component for enhancing the effect of removing foreign matter. The washer fluid is reserved in a washer fluid tank 60. The washer fluid is pumped out of washer fluid tank 60 by a pump 61 and supplied through a washer fluid supply pipe 62 to lidar apparatus 100. A washer fluid inlet 63 of lidar apparatus 100 is disposed in rotational shaft 53. Washer fluid supply pipe 62 is connected to washer fluid inlet 63. Washer fluid tank 60, pump 61, washer fluid supply pipe 62, washer fluid inlet 63, washer fluid pipe 57, and washer fluid supply hole(s) 58 constitute a washer fluid supplier for supplying the washer fluid to the external surface of light transmission window 51. Pump 61 is secured with a fixture at a predetermined position near the bottom of washer fluid tank 60.

In casing 50, optical casing 20 which houses the devices constituting optical device 21 and other components disposed outside optical casing 20, that are, a hard disk 26 and a circuit board 25 equipped with A/D converter 8, a CPU (Central Processing Unit) 22, a volatile memory 23, and a nonvolatile memory 24 are provided. Hard disk 26 is long-term storage device 10. Signal processor 9 and controller 12 are implemented by dedicated software running on CPU 22, and the dedicated software is stored in nonvolatile memory 24. Instead of hard disk 26, a nonvolatile memory may be used.

Figure 5:
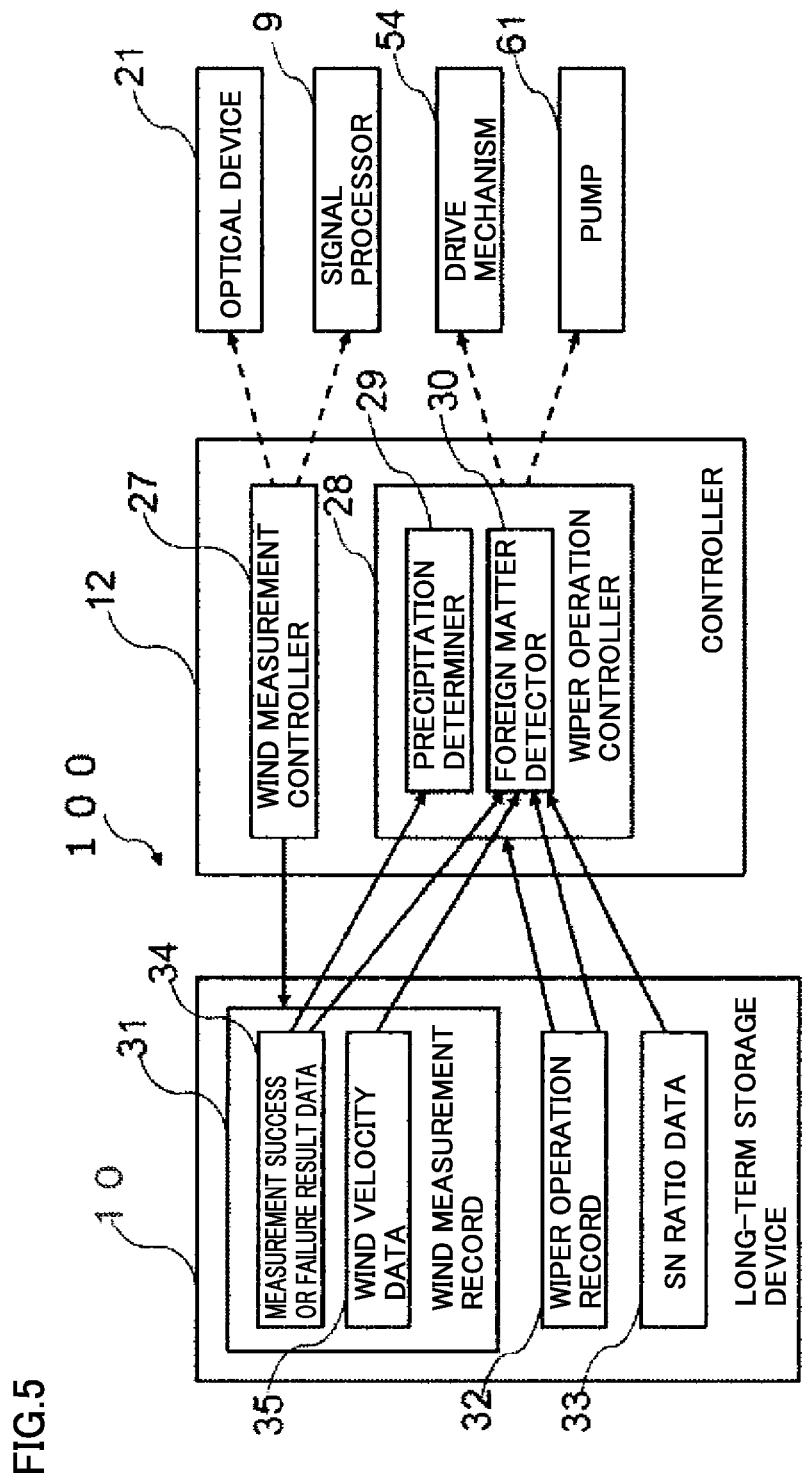
FIG. 5 is a functional block diagram illustrating a functional configuration of the lidar apparatus according to the first embodiment.

FIG. 5 is a functional block diagram illustrating a functional configuration of the lidar apparatus according to the first embodiment. Controller 12 includes a wind measurement controller 27 controlling optical device 21 and signal processor 9 to measure a wind velocity vector, and a wiper operation controller 28 controlling drive mechanism 54 for driving wiper 52 rotationally and pump 61 for causing the washer fluid to jet out. Wind measurement controller 27 stores the measured wind velocity vector in long-term storage device 10. Wiper operation controller 28 refers to long-term storage device 10 to determine a wiper operation, and stores, in long-term storage device 10, an operation history such as operating time, operating intervals, and the type of operation of the wiper. The type of operation of the wiper includes a type about whether or not the washer fluid is used, a type of duration for wiper operation, or the like.

Wiper operation controller 28 includes a precipitation determiner 29 determining whether or not precipitation exists on the external surface of light transmission window 51, and a foreign matter detector 30 detecting the presence of foreign matter, which hinders transmission of the laser light and the reflected light through light transmission window 51, on the external surface of light transmission window 51.

Long-term storage device 10 stores a wind measurement record 31, a wiper operation record 32, and SN ratio data 33. In wind measurement record 31, measurement success or failure result data 34 indicating whether or not a wind velocity vector is measured from each range (altitude) of a predetermined time period, and wind velocity data 35 which is the measured wind velocity vector are recorded. As to the number of a range, the larger the number of a range, the longer the distance from lidar apparatus 100. The range closest to lidar apparatus 100 is referred to as Range 0. In wiper operation record 32, the time when the wiper is made to operate, the type of operation, and the time elapsed since the preceding wiper operation are recorded. In SN ratio data 33, the SN ratio of the received signal of a predetermined range of each beam in an immediately preceding predetermined time period are recorded.

Wiper operation controller 28 is periodically activated to monitor whether or not the wind velocity vector is measured and to determine whether or not to cause the wiper to operate. And when it is determined that the wiper is to operate, it determines the type of operation among a wiper operation for a normal time, a wiper operation for a short time, or one back-and-forth reciprocation of the wiper. For the one back-and-forth reciprocation of the wiper, the wiper is made to operate in one back-and-forth reciprocation over light transmission window 51 without using the washer fluid. For the wiper operation for a normal time and the wiper operation for a short time, the wiper is made to operate while the washer fluid is fed. The one back-and-forth reciprocation of the wiper is an operation performed when it is determined that precipitation exists. In the case where the preceding wiper operation is performed for a normal time period and the wiper is required to operate with a short elapsed time from the preceding wiper operation, the wiper operation for a short time may be able to remove foreign matter. Thus, the wiper operation for a short time is used when the elapsed time from the preceding wiper operation is short. By using the wiper operation for a short time, we can save the washer fluid compared with the case where only the wiper operation for a normal time period is used.

A process for determining whether or not the wiper operation is necessary is described. The following variables are used. Variables such as T1 are adjusted to be appropriate.

T1: The interval at which the wind velocity vector is measured. T1 is on the order of several seconds.

T2: The length of time period for which the wind velocity measurement record is considered in determining whether or not the wiper operation is necessary. The length of T2 corresponds to several T1 periods.

N: The number of timings at which the wind velocity is measured within T2. N=[T2/T1]. [X] is the largest integer equal to or less than a real number X.

T3: The length of a predetermined period from the end of the wiper operation. T3 is on the order of T2.

C(n): The wind velocity acquisition ratio at measurement timing n.

C(n)=Ratio of the number of selected ranges from which the wind velocity vector is measured to the number of selected ranges.

Dn: The wind velocity acquisition ratio within an immediately preceding period having length T2.

Dp: The wind velocity acquisition ratio within a period having length T2 preceding the immediately preceding period having length T2.

γ: The change ratio of the acquisition ratio. γ=Dn/Dp. γ is calculated periodically, For example, once every T1 period.

Hd: A Threshold for wind velocity acquisition ratio Dn. Hd is a small value such as approximately 0.1, for example.

Hr: A threshold for change ratio γ of the acquisition ratio. Hr is a value such as approximately 0.5, for example.

TA: A normal time for which the wiper operates. TA is approximately one second, for example.

TB: A short time for which the wiper operates. TB<TA. TB is approximately 0.5 second, for example.

Jc: A variable representing a type of operation of the wiper. Jc is any one of no operation, TA, TB, and one back-and-forth reciprocation.

Jw: A variable representing whether or not a wind direction condition is satisfied. Jw takes the value "satisfied" or "not satisfied."

Js: A variable representing whether or not an SN ratio decrease condition is satisfied. Js takes the value "satisfied" or "not satisfied."

Here, the selected range refers to a range selected by an operator from all ranges. As is described later, the wind direction condition and the SN ratio decrease condition are a part of the conditions for determining whether or not precipitation exists.

Dn and Dp are calculated in the following way where m is the current measurement timing.

Dn=ΣC(n)/N calculate the average of C(n) where n=m, m−1, . . . , m−N+1

Dp=ΣC(n)/N calculate the average of C(n) where n=m−N, m−N−1, m−2N+1

Dn is the ratio of the number of measured wind velocity vectors with respect to the total number of wind velocity vectors to be measured for selected ranges within an immediately preceding predetermined fifth period T3. The latest measurement C(m) is the wind velocity acquisition ratio, where the fifth period is set to be a period including one measurement timing.

It is described a measurement state representing a state regarding whether or not the wind velocity vector is measured. The measurement states are classified with Dn and γ in the following way. Variable K represents the measurement state.

Normal: The state where Dn>Hd and γ>Hr.

Worse: The state where $Dn>Hd$ and $\gamma \leq Hr$.

Impossible: The state where $Dn \leq Hd$.

As seen from the above, the wind velocity acquisition ratio is used for at least a part of the measurement success or failure result indicating whether or not the wind velocity vector is measured.

As is described later, when the measurement state changes from Normal to Worse or Impossible, the wiper is made to operate. Foreign matter detector 30 performs a process for determining whether the measurement state is Worse or Impossible.

One reason why the Impossible measurement state K and the Worse measurement states K are distinguished from each other is to determine, based on these measurement states, whether the time for wiper operation is normal time TA or short time TB (<TA). If the wiper is always made to operate for the constant time, it is unnecessary to distinguish the Impossible state and the Worse state from each other. In determining whether the measurement state is Impossible or not, not only Dn but also $\gamma=Dn/Dp$ may be considered. In determining whether the measurement state is Worse or not, Dn may be considered as well. Instead of $\gamma$, Dn–Dp may be used. We can use any indicator as long as the indicator indicates that the wind velocity acquisition ratio is lowered to be less than a predetermined decrease threshold.

Lidar apparatus 100 operates based on measurement state K. In order to control lidar apparatus 100 appropriately, operating states of lidar apparatus 100 are defined in the following way. The operating states are determined based on measurement state K or the like.

There are six different operating states as follows.

Under Monitoring: The state where measurement state K is Normal.

Impossible Detected: The state where K=Impossible is detected during the Under Monitoring state.

Worse Detected: The state where K=Worse is detected during Under Monitoring state.

Wiper in Operation: The state where the wiper is operating.

After Wiper Operation: The state where K=Worse or Impossible continues before T3 has elapsed since the latest wiper operation.

Intermittent: The state where K=Worse or Impossible holds when T3 has elapsed since the wiper operation.

Operating states are represented with the following variables. Current operating state is an operating state which is set last. Preceding operating state is an operating state which has been set before the current operating state is set.

Rn: current operating state

Rp: preceding operating state

Figure 6:
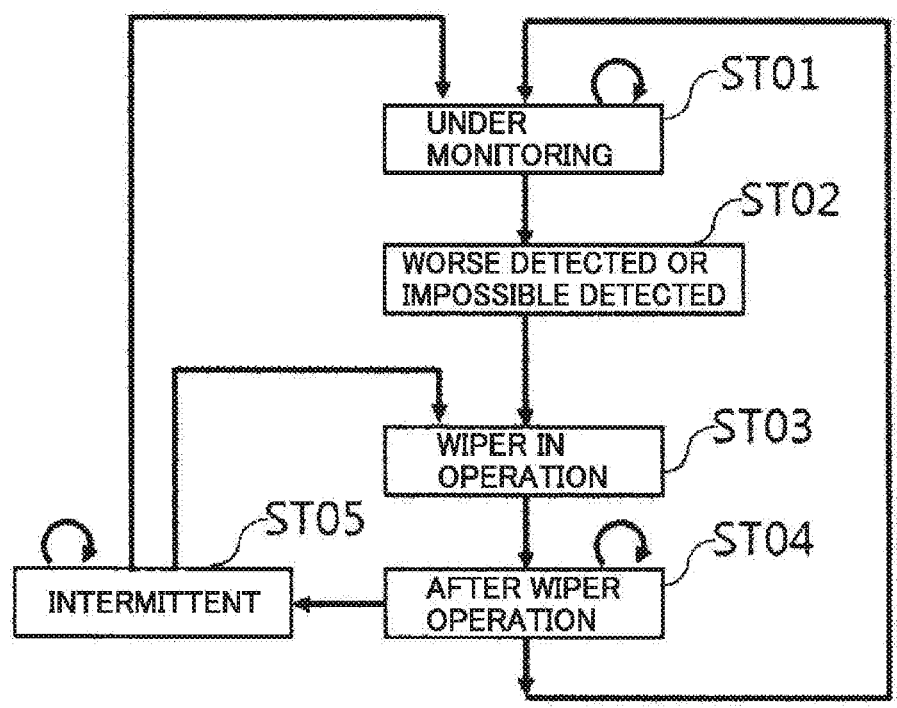
FIG. 6 is a state transition diagram illustrating an operation of the lidar apparatus according to the first embodiment.

FIG. 6 is a state transition diagram illustrating an operation of the lidar apparatus according to the first embodiment. State ST01 which is the operating state in which the viable is set as Rn=Under Monitoring continues as long as measurement state K=Normal continues. When Dn decreases, K=Worse or Impossible is detected and the state changes to state ST02 in which Rn=Worse Detected or Impossible Detected. In response to the change to state ST02, the wiper is made to operate and the state changes to state ST03 in which Rn=Wiper in Operation. In response to completion of the wiper operation, the state changes to state ST04 in which Rn=After Wiper Operation. In state ST04, it is monitored whether or not K returns to Normal in the period from the completion of the wiper operation to the time when T3 has elapsed. When K=Normal is detected in state ST04, the state returns to state ST01 in which Rn=Under Monitoring. When K=Normal cannot be detected when T3 has elapsed since the completion of the wiper operation, the state is changed to state ST05 in which Rn=Intermittent. In state ST05, the wiper is made to operate at predetermined intervals and the state is change to state ST03 in which Rn=Wiper in Operation. When K=Normal is detected in the state in which Rp=Intermittent, this situation, however, does not occur under normal condition, the state is changed to ST01 in which Rn=Under Monitoring. This situation corresponds to the case where foreign matter is removed without the wiper operation or the effect of the wiper operation is exhibited after T3 has elapsed.

A reason why state ST04 in which Rn=After Wiper Operation is provided is described. Dn is an average wind velocity acquisition ratio for selected ranges in measurement of the wind velocity within the immediately preceding period having length T2. Therefore, in the period from the wiper operation to the time when T2 has elapsed, Dn is calculated from data including the results of the wind velocity measurement used for determining that the state is Impossible or Worse. Accordingly, even when the wind velocity vector is measured normally after the wiper operation, the state corresponding to measurement state K=Impossible or Worse continues. Since it is unnecessary to cause the wiper to operate in such a state, it is provided an operating state, expressed as Rn=After Wiper Operation, for a state where K=Normal is not detected in the period from the wiper operation to the time when T3 has elapsed. In the operating state in which Rn=After Wiper Operation, the wiper is not caused to operate. T3 is set appropriately to a time on the order of T2.

In order to express the condition on which it is determined whether the wiper is made to operate for normal time TA or short time TB, the following variables are defined.

Tw=The time elapsed since the latest wiper operation.

Ty=The time elapsed from the second latest wiper operation to the latest (last) wiper operation.

W 1: The interval at which the wiper is made to operate during the Intermittent operating state. W1 is on the order of one minute, for example.

W2: A threshold for Tw used in determining whether the wiper operation is performed for normal time TA or short time TB. W2 is on the order of two minutes, for example.

W3: A threshold for Tw and Ty used in determining whether precipitation exists or not. W3 is on the order of three minutes, for example.

A condition on which the wiper is made to operate for normal time TA (called normal operating condition) is expressed as follows.

> Normal operating condition=(current operating state is Impossible Detected [$Rn$=Impossible Detected]) or
>
> (current operating state is Worse Detected [$Rn$=Worse Detected], and $W2$ has elapsed since the latest wiper operation [$Tw \geq W2$])

A condition on which the wiper is made to operate for short time TB (called short-time operating condition) is expressed as follows.

> Short-time operating condition=(current operating state is Worse Detected [$Rn$=Worse Detected], and $W2$ has not elapsed since the latest wiper operation [$Tw<W2$])

Whether or not the short-time operating condition is satisfied is represented with variable Jt.

A condition on which the wiper is made to operate in the state in which Rn=Intermittent (called intermittent operating condition) is expressed as follows. In the Intermittent state, the wiper is made to operate for normal time TA.

> Intermittent operating condition=(current operating state is Intermittent [Rn=Intermittent], and W1 has elapsed since the latest wiper operation [Tw≥W1])

A precipitation determination condition which is a condition for determining whether or not precipitation exists is expressed with the intervals of the wiper operations, the wind direction after the latest wiper operation, and the fact that the SN ratio decreases from the value improved by the wiper operation, and the like. The condition regarding the wind direction after the latest wiper operation is called wind direction condition. The condition regarding the fact that the SN ratio improved by the wiper operation decreases is referred to as a signal-to-noise ratio decrease condition (abbreviated as SN ratio decrease condition).

The precipitation determination condition is expressed as follows. Precipitation determiner 29 checks whether or not the precipitation condition is satisfied.

> Precipitation determination condition=(current operating state is Worse Detected or Impossible Detected [Rn=Worse Detected or Impossible Detected],
>
> and
>
> W3 has not elapsed since the latest wiper operation [Tw<W3],
>
> and
>
> the interval from the second latest wiper operation to the latest wiper operation is less than W3 [Ty<W3],
>
> and
>
> the wind direction condition is satisfied [Jw=Satisfied],
>
> and
>
> the SN ratio decrease condition is satisfied [Js=Satisfied]).

When precipitation falls, the wiper operation makes it possible to measure the wind velocity vector for a while, but water droplets existing on light transmission window 51 makes it impossible to measure the wind velocity vector. It is determined that there is a high possibility of precipitation when the wiper operation is repeated within a predetermined time (W3). The time from the wiper operation to the time when it becomes impossible to measure the wind velocity vector varies depending on the amount of precipitation per unit time or the like. If W3 is set large, it can be determined that precipitation falls even when there is a small amount of precipitation. However, a possibility that it is determined that precipitation falls while actually precipitation does not fall is increased.

A wiper operation interval condition is a condition regarding the intervals at which the wiper is made to operate and is considered in determining whether precipitation exists or not. The wiper operation interval condition in this embodiment is a condition in that the detection, as described below, within a predetermined second period W3 from a wiper operation is repeated a predetermined number of times (twice) or more. The detection is the detection of the fact that the measurement state K returns to Normal caused by the improvement of the wind velocity acquisition ratio after the wiper operation and thereafter becomes Worse or Impossible caused by the decrease of the wind velocity acquisition ratio.

An SN ratio decrease condition is a condition for detecting the phenomenon that, after the wiper is made to operate to remove water droplets on light transmission window 51 and thereby the SN ratio is improved, the SN ratio is lowered by water droplets existing on light transmission window 51. Decrease of the SN ratio by a prescribed amount occurs in a short time if rain or snow falls heavily or occurs in a longer time if rain or snow falls lightly. The SN ratio decrease condition is a condition for detecting that decrease of the SN ratio of the predetermined range by the prescribed amount within a predetermined time occurs in a region having a predetermined ratio or more of light transmission window 51. The SN ratio decrease condition is expressed with the SN ratio of Range 0 in this embodiment. The predetermined range used in the SN ratio decrease condition may be one or more ranges, as long as it/they is/are determined appropriately.

In order to express the SN ratio decrease condition, the following variables are defined.

$S_{n0}(j)$: The SN ratio of Beam j of Range 0 at the time of the latest measurement of the wind velocity.

$S_{p0}(j)$: The SN ratio of Beam j of Range 0 immediately after the latest wiper operation.

$E(j)$: The amount of decrease of $S_{n0}(j)$ from $S_{p0}(j)$. $E(j)=S_{p0}(j)-S_{n0}(j)$ Hs: A threshold for $E(j)$ used in determining whether or not precipitation exists. Hs is called a prescribed decay, and is on the order of a few dB, for example.

Ws: The upper limit of time in which whether or not $E(j) \geq Hs$ is determined. Ws is on the order of 30 seconds, for example.

Ns: The number of beams satisfying $E(j) \geq Hs$, namely the number of beams whose SN ratio has decreased by more than the prescribed decay.

Hn: A threshold for Ns. Hn is three beams when five beams are used, for example.

The SN ratio decrease condition is expressed as the condition to be satisfied as follows.

> SN ratio decrease condition=(Ws has not elapsed since the latest wiper operation [Tw<W3],
>
> and
>
> (the number [Ns] of beams j whose SN ratio at Range 0 has decreased by the prescribed decay or more [E(j)≥Hs] is Hn or more [Ns≥Hn]))

Prescribed decay Hs is determined desirably to be a value that can judge the decrease of the SN ratio and that is higher than the value that makes it impossible to measure the wind velocity vector. When the SN ratio decrease condition is satisfied, the condition is kept satisfied still after Ws has elapsed since the latest wiper operation. In the case where the SN ratio decrease condition is kept non-satisfied when Ws has elapsed, the SN ratio decrease condition is kept non-satisfied after Ws has elapsed.

A reason for defining the condition: the number of beams whose SN ratio has decreased by the prescribed decay or more is equal to or more than Hn within Ws which is a predetermined third period from the latest wiper operation (before Ws has elapsed), is to distinguish precipitation from the case where dust or the like exists on only a part of light transmission window 51. If there is precipitation, the SN ratio decreases at first in approximately the same region of light transmission window 51 as compared with the case where dust or the like exists on light transmission window 51, but thereafter the region where the SN ratio decreases increases gradually. In the case where dust or the like exists on light transmission window 51, the region in which the SN ratio decreases does not increase with time. In order to determine that precipitation exists before the SN ratio decreases in the whole light transmission window 51, it is provided the SN ratio decrease condition, which is expressed as the condition that the number of beams whose SN ratio decrease by more than the prescribed decay within Ws is equal to or more than a predetermined number.

In order to express the wind direction condition, the following variables are defined. The vertical wind speed is the wind speed in the vertical direction (vertical component of the wind velocity vector).

V(j,k): The line-of-sight velocity measured from Range k of Beam j.

Vz1(k): The vertical wind speed measured from Beam 0 in the vertical direction.

$$Vz1(k)=V(0,k)$$

Vz2(k): The vertical wind speed measured from Beams 1 and 3 inclined northward and southward by θ.

$$Vz2(k)=(V(1,k)+V(3,k))*(\tfrac{1}{2})*\cos\theta$$

Vz3(k): The vertical wind speed measured from Beams 2 and 4 inclined eastward and westward by θ.

$$Vz3(k)=(V(2,k)+V(4,k))*(\tfrac{1}{2})*\cos\theta$$

When precipitation falls, wind often blows downward. Therefore, a wind direction condition that wind blows downward is used in the precipitation determination condition. The wind direction condition is applied to the wind velocity vector measured first (for the first time) after the latest wiper operation. A reason for selecting the wind velocity vector measured at this timing is that the timing is closest to the period in which the precipitation hinders measurement of the wind velocity and has a high possibility that the wind velocity vectors can be measured accurately for many ranges. In the case of precipitation, with the elapse of time since the wiper operation, water droplets existing on light transmission window 51 increase and thus the SN ratio decreases. The decrease of the SN ratio increases the possibility that the wind velocity vector cannot be measured, and the precision of the measured wind velocity also decreases. Not only the wind velocity vector measured for the first time after the latest wiper operation but also the vertical component of the wind velocity vector measured in the fourth period after the latest wiper operation may be used.

The wind direction condition is expressed as follows, for example. As to the wind speed in the vertical direction, the downward direction of the wind has a negative value.

Jw=Satisfied holds when Vz1(k), Vz2(k), Vz3(k) of predetermined ranges k calculated from the wind velocity measured immediately after the latest wiper operation all show the downward direction [for all predetermined ranges k, Vz1(k)<0 and Vz2(k)<0 and Vz3(k)<0]. Otherwise, Jw=Non-Satisfied. Range k where there is a beam for which the speed in the beam direction cannot be measured is not used in making the determination as to the wind direction condition. The predetermined ranges (altitudes) may be all altitudes at which the wind velocity vector is measured, or ranges at a certain altitude or less, or the like.

Since the wind speed in the vertical direction (vertical component of the wind velocity vector) measured in the three ways, namely Vz1(k), Vz2(k), Vz3(3) each is the speed in the downward direction, the wind in the downward direction can be determined reliably even when the wind is weak. The measured wind velocity vector has an error, and therefore, a wind speed threshold 0) is determined so as to be corresponded to the error and it may be determined that the wind direction condition is satisfied when the vertical components of the wind velocity vectors are equal to or less than the wind speed threshold.

Figure 7:
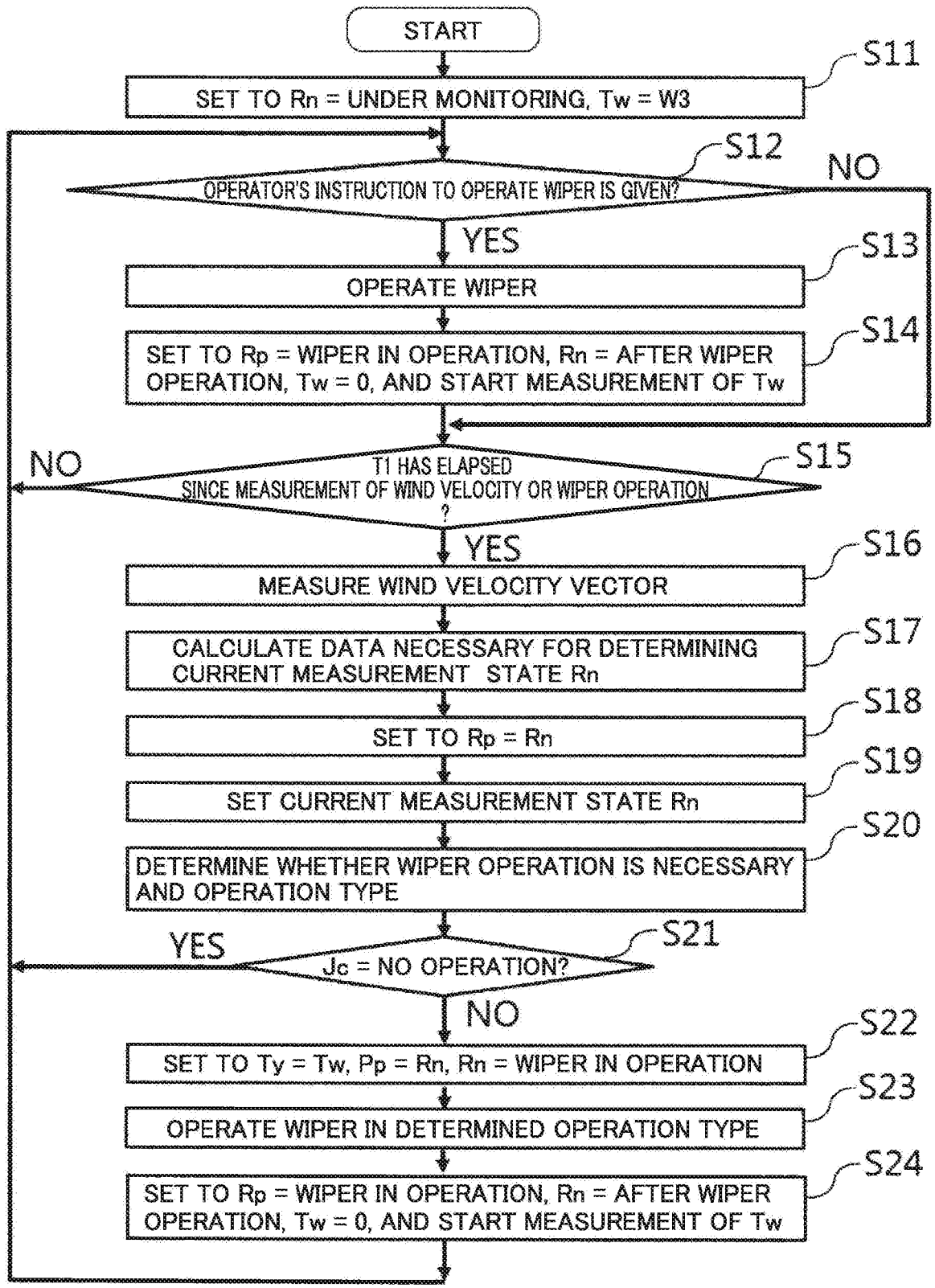
FIG. 7 is a flowchart illustrating an operation of the lidar apparatus according to the first embodiment.

An operation is described. FIG. 7 is a flowchart illustrating the operation of the lidar apparatus according to the first embodiment. In FIG. 7, details about the wiper operation are illustrated.

In step S11, the initial state is set to the state in which Rn=Under Monitoring and Tw=W3. In other words, the initial state is state ST01 shown in FIG. 6. The variable is set as Tw=W3, and accordingly a state where the wiper is not made to operate even once since activation of lidar apparatus 100 is treated identically to the state where W3 has elapsed since the wiper operation.

In step S12, it is checked whether or not an operator's instruction to cause the wiper to operate is given. When the operator's instruction is given (YES in S12), the wiper is made to operate in step S13. In step S14, the variables are set as Rp=Wiper in Operation, Rn=After Wiper Operation, and Tw=0, and measurement of Tw is started.

After step S14 is performed or when there is no operator's instruction (NO in S12), it is checked in step S15 whether or not T1 has elapsed since measurement of the wind velocity or since the wiper operation. When T1 has elapsed (YES in S15), the wind velocity vector is measured in step S16. The wind velocity vector is measured according to the flowchart shown in FIG. 2.

In step S17, data necessary for determining the current operating state Rn is calculated. A process for setting the data necessary for determining the current operating state Rn is described later. In step S18, the variable is set as Rp=Rn. In step S19, the current operating state Rn is set. A process for setting Rn is described later.

When the current operating state Rn is set, whether or not the wiper operation is necessary and the type of operation are determined in step S20. A method for the determination is described later.

In step S21, it is checked whether or not the wiper operation is unnecessary [Jc=No Operation?]. When the wiper operation is unnecessary (YES in S21), the process returns to S12. When the wiper operation is not unnecessary (NO in S21), the variables are set as Ty=Tw, Rp=Rn, and Rn=Wiper in Operation in step S22. In step S23, the wiper is made to operate in accordance with the determined operation type. In step S24, the variables are set as Rp=Wiper in Operation, Rn=After Wiper Operation, and Tw=0, and measurement of Tw is started. After this, the process returns to S12.

Figure 8:
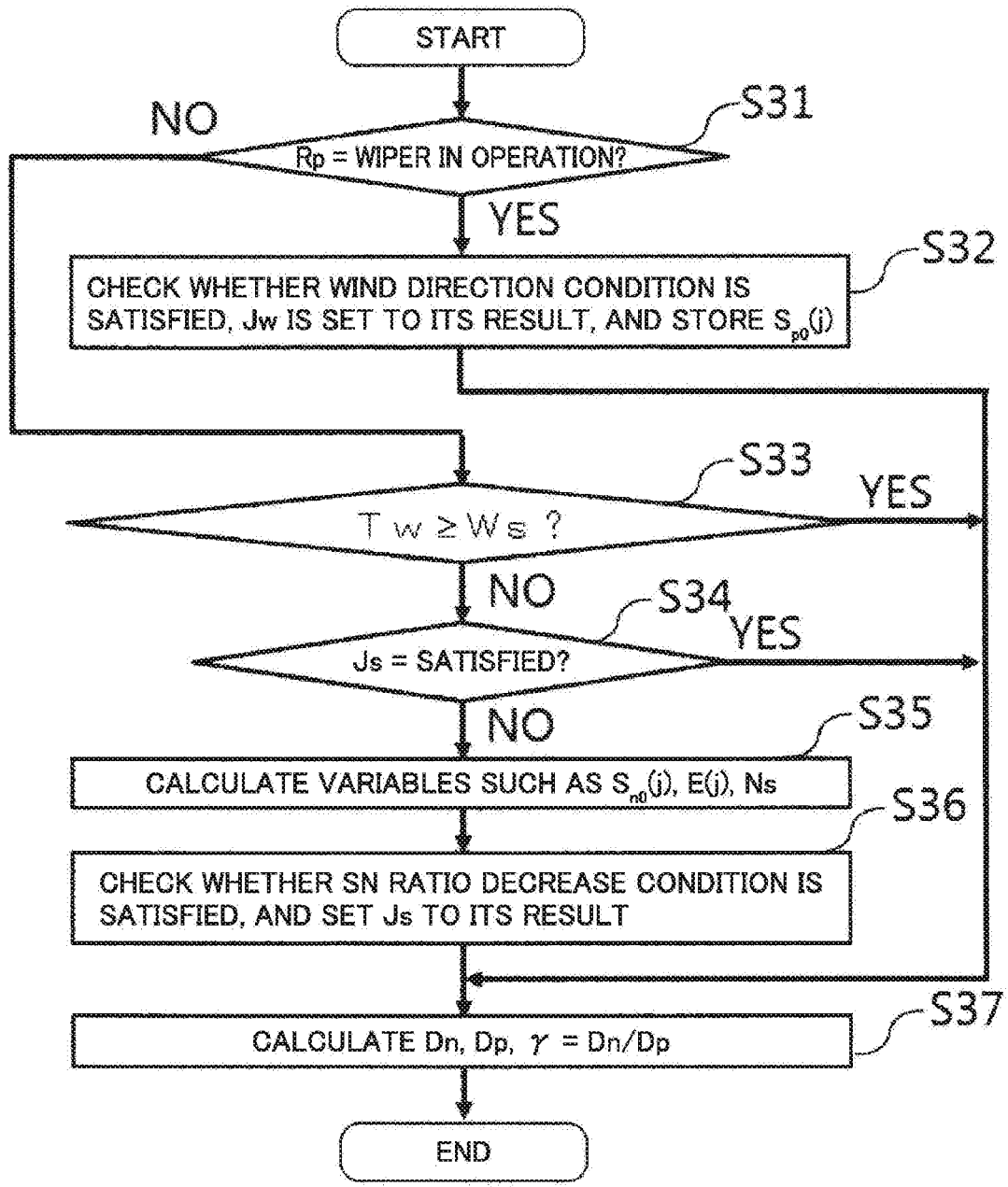
FIG. 8 is a flowchart illustrating an operation of an example of the process for calculating data necessary for determining the current operating state by the lidar apparatus according to the first embodiment.

Referring to FIG. 8, a description is given of the process, performed in S17, for calculating the data necessary for determining the current operating state Rn. FIG. 8 is a flowchart illustrating an operation of an example of the process for calculating the data necessary for determining the current operating state by the lidar apparatus according to the first embodiment.

In S31, it is checked whether or not the measurement of the wind velocity is the first time after the wiper operation [Rp=Wiper in Operation?]. When it is so (YES in S31), it is checked in step S32 whether or not the wind direction condition is satisfied, and Jw is set to the result and $S_{p0}(j)$ is stored.

When the answer is NO in S31, it is checked in step S33 whether or not Ws has elapsed since the latest wiper operation [Tw≥Ws?]. When Ws has not elapsed since the latest wiper operation (NO in S33), it is checked in step S34 whether or not the SN ratio decrease condition Js is satisfied [Js=Satisfied?]. When Js is not satisfied (NO in S34), variables such as $S_{n0}(j)$, E(j), Ns are calculated in step S35. In step S36, it is checked whether or not the SN ratio decrease condition is satisfied, and Js is set to the result.

After S32 or S36 is performed or when the answer is YES in S33 or the answer is NO in S34, calculations are performed in step S37 of the average wind velocity acquisition ratio Dn for selected ranges in an immediately preceding period having length T2, the wind velocity acquisition ratio Dp for selected ranges in a period having length T2 preceding the immediately preceding period having length T2, and the acquisition ratio change ratio γ=Dn/Dp.

Figure 9:
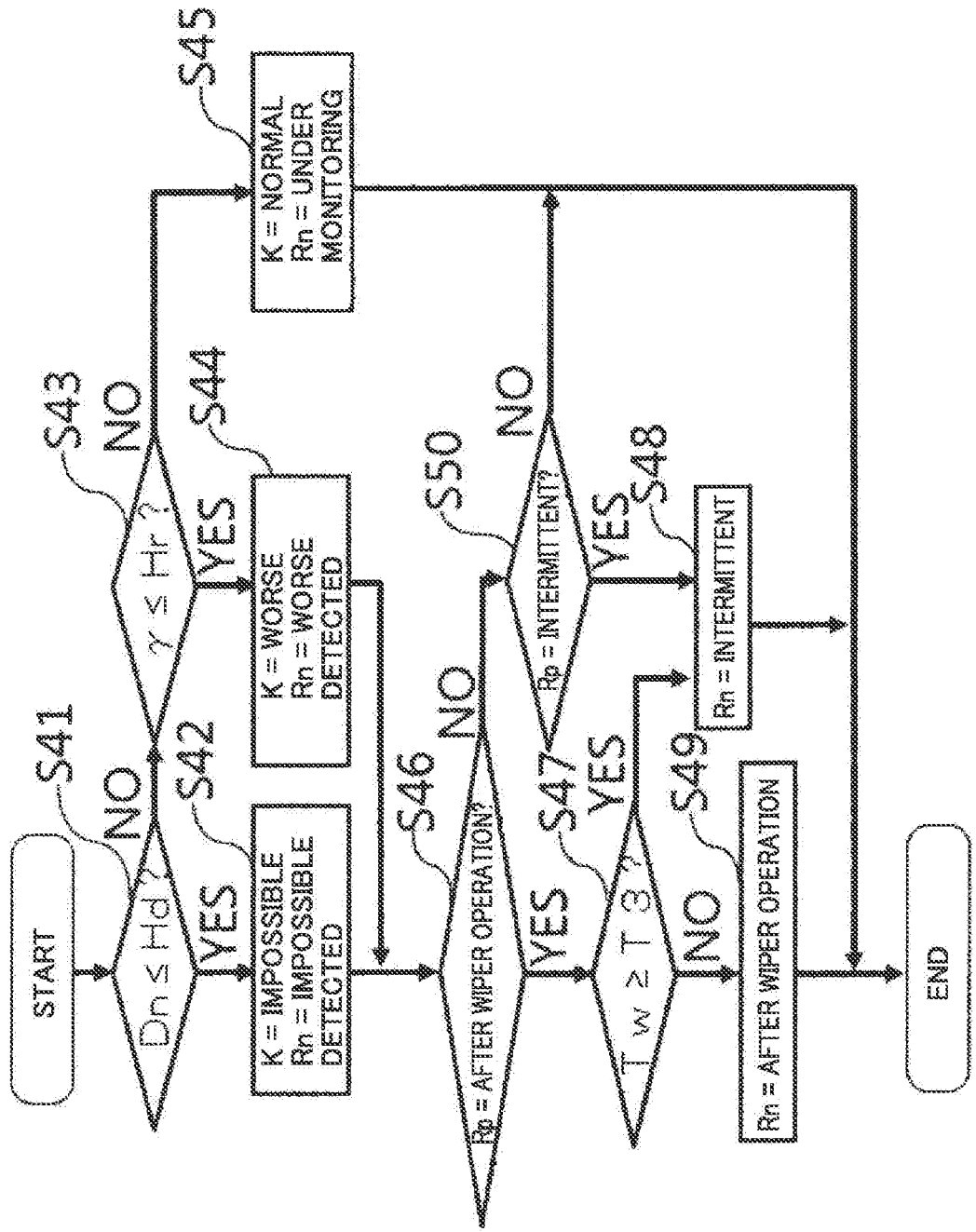
FIG. 9 is a flowchart illustrating an operation of an example of the process for determining an operating state by the lidar apparatus according to the first embodiment.

Referring to FIG. 9, the process for setting the current operating state Rn which is performed in S19 is described. FIG. 9 is a flowchart illustrating the operation of an example of the process for determining the operating state by the lidar apparatus according to the first embodiment. The process of changing to Rn=Wiper in Operation or Rn=After Wiper Operation is not included in FIG. 9. Rn is set as Rn=Wiper in Operation in S22 of FIG. 7. Rn is set as Rn=After Wiper Operation in S24.

At first measurement state K is set and Rn is set in accordance with K. In step S41, it is checked whether or not Dn≤Hd holds. When Dn≤Hd holds (YES in S41), the variables are set as K=Impossible and Rn=Impossible Detected in step S42. When Dn>Hd holds (NO in S41), it is checked in step S43 whether or not γ≤Hr holds. When γ≤Hr holds (YES in S43), the variables are set as measurement state K=Worse and Rn=Worse Detected in step S44. When γ>Hr holds (NO in S43), the variables are set as K=Normal and Rn=Under Monitoring in step S45.

In the case of Rp=After Wiper Operation and K=Worse or Impossible at the time when T3 has elapsed since the wiper operation [Tw≥T3], the variable is set as Rn=Intermittent. When T3 has not elapsed, the variable is set as Rn=After Wiper Operation. The steps from S46 to S49 are a process for the treatments explained above. After S42 or S44 is performed, it is checked in step S46 whether or not Rp=After Wiper Operation holds. When Rp=After Wiper Operation holds (YES in S46), it is checked in step S47 whether or not Tw≥T3 holds. When Tw≥T3 holds (YES in S47), the variable is set as Rn=Intermittent in step S48. When Tw<T3 holds (NO in S47), the variable is set as Rn=After Wiper Operation in step S49.

When Rp=Intermittent holds and K=Worse or Impossible holds, the variable is set as Rn=Intermittent. When Rp=Intermittent does not hold and K=Worse or Impossible holds, Rn remains as set in S42 or S44. Steps S50 and S48 are a process for the treatments explained above. When Rp=After Wiper Operation does not hold (NO in S46), it is checked in step S50 whether or not Rp=Intermittent holds. When Rp=Intermittent holds (YES in S50), the process proceeds to step S48. When Rp=Intermittent does not hold (NO in S50), the process is ended.

Figure 10:
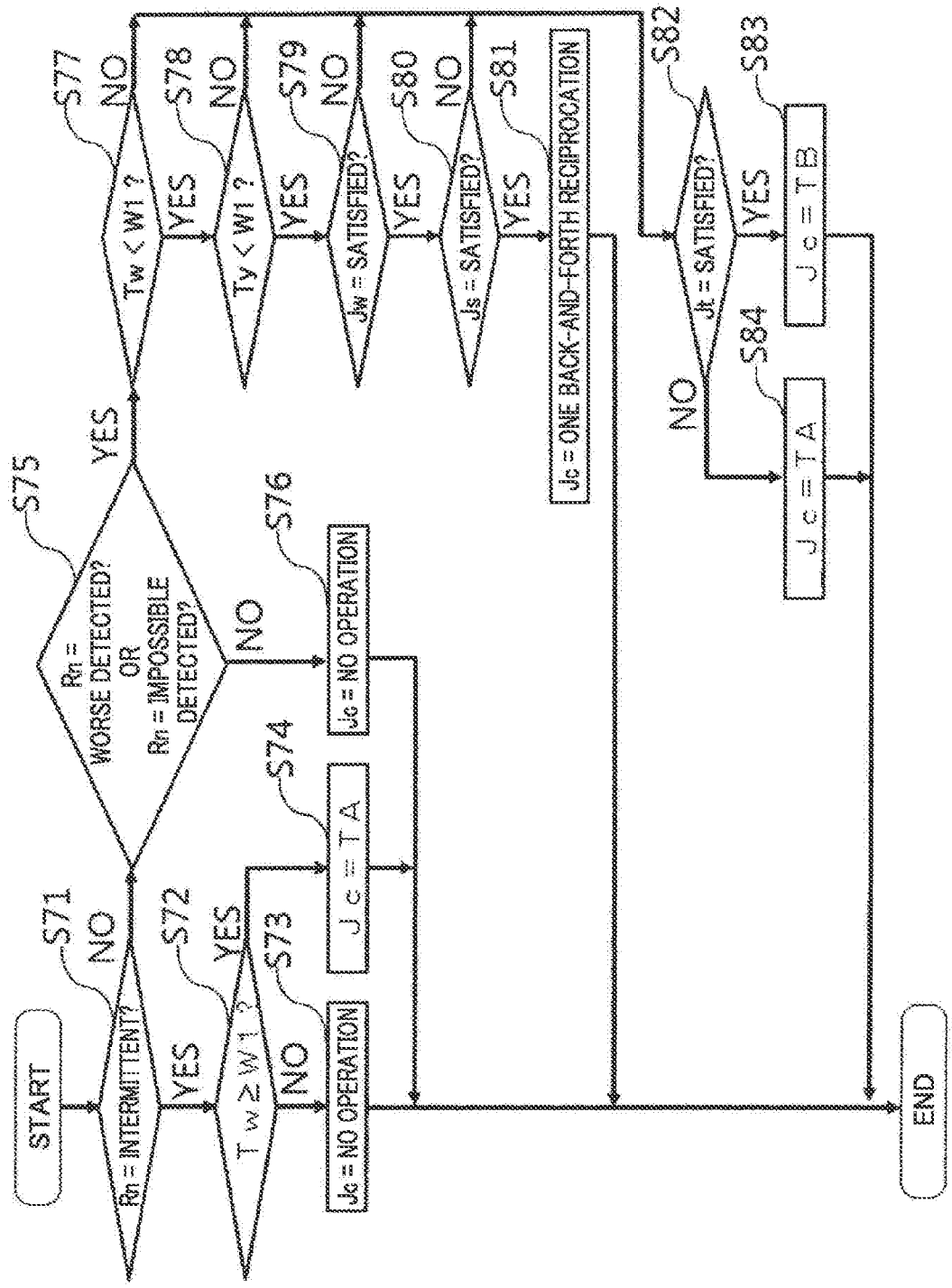
FIG. 10 is a flowchart illustrating an operation of an example of the process for determining whether or not a wiper operation is necessary and the type of operation by the lidar apparatus according to the first embodiment.

Referring to FIG. 10, the process for determining whether or not the wiper operation is necessary and the type of operation performed in S20 is described. FIG. 10 is a flowchart illustrating an operation of an example of the process for determining whether or not the wiper operation is necessary and the type of operation by the lidar apparatus according to the first embodiment.

In steps S71 to S74, it is determined whether or not the wiper operation in the intermittent mode is necessary. In step S71, it is checked whether Rn=Intermittent holds or not. When Rn=Intermittent holds (YES in S71), it is checked in step S72 whether Tw≥W1 holds. When Tw≥W1 does not hold (NO in S72), the variable is set as Jc=No Operation in step S73, since the wiper operation in the case of Rn=Intermittent is on standby until W1 has elapsed since the latest wiper operation. When Tw≥W1 holds (YES in S72), the variable is set as Jc=TA in step S74.

When Rn=Intermittent does not hold (NO in S71), it is checked in step S75 whether Rn is Worse Detected or Impossible Detected. When Rn is neither Worse Detected nor Impossible Detected (NO in S75), the variable is set as Jc=No Operation in step S76.

When Rn is Worse Detected or Impossible Detected (YES in S75), it is checked in steps S77 to S80 whether the precipitation determination condition is satisfied or not. In step S77, it is checked whether W3 has not elapsed since the latest wiper operation [Tw<W3?]. When W3 has not elapsed (YES in S77), it is checked in step S78 whether or not the interval from the second latest wiper operation to the latest (last) wiper operation is less than W3 [Ty<W3?]. When Ty is less than W3 (YES in S78), it is checked in step S79 whether the wind direction condition is satisfied or not [Jw=Satisfied?]. When the wind direction condition is satisfied (YES in S79), it is checked in step S80 whether the SN ratio decrease condition is satisfied or not [Js=Satisfied?]. When the SN ratio decrease condition is satisfied (YES in S80), the variable is set as Jc=One Back-and-Forth Reciprocation in step S81.

When the precipitation determination condition is not satisfied, that is, the answer is NO in any of S77 to S80, it is checked in step S82 whether the short-time operation condition is satisfied or not [Jt=Satisfied?]. When the short-time operation condition is satisfied (YES in S82), the variable is set as Jc=TB in step S83. When the short-time operation condition is not satisfied (NO in S82), the variable is set as Jc=TA in step S84.

Figure 11:
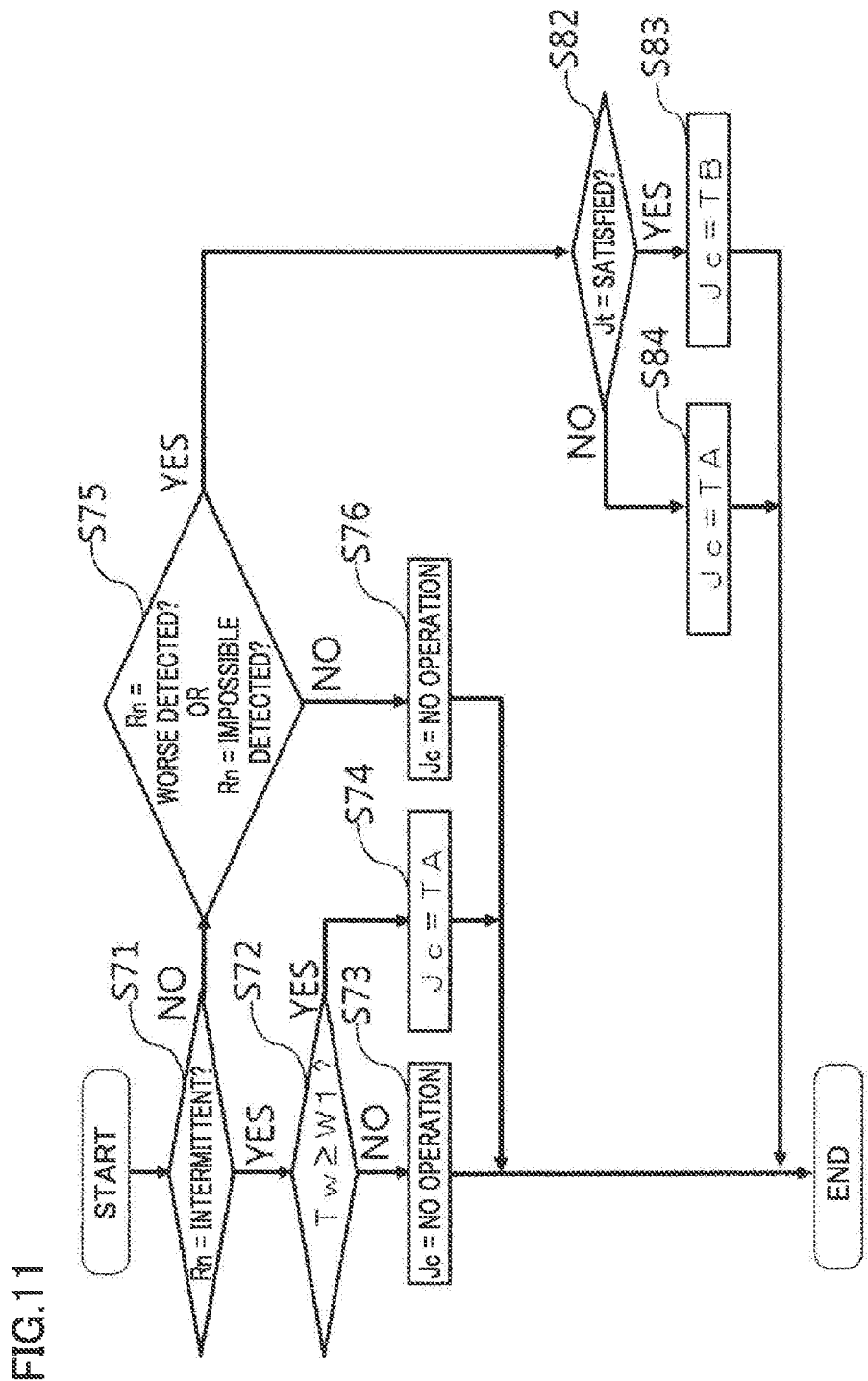
FIG. 11 is a flowchart illustrating, as a comparative example, an operation of an example of the process for determining whether or not a wiper operation is necessary and the type of operation without considering a precipitation determination condition.

As a comparative example, a process is described for determining whether or not the wiper operation is necessary and the type of operation without considering the precipitation determination condition. FIG. 11 is a flowchart illustrating, as a comparative example, an operation of an example of the process for determining whether or not the wiper operation is necessary and the type of operation without considering the precipitation determination condition. As compared with FIG. 10, steps S77 to S81 are not included in FIG. 11. Accordingly, the comparative example causes the wiper to operate while using a washer fluid even when lidar apparatus 100 determines that precipitation exists and causes the wiper to operate without using the washer fluid.

When precipitation falls, water droplets existing on light transmission window 51 causes the SN ratio of the received signal and the wind velocity acquisition ratio to be decreased. The wiper is made to operate in response to detecting the decrease of the wind velocity acquisition ratio, and accordingly the water droplets existing on light transmission window 51 are removed. And then the SN ratio and the wind velocity acquisition ratio are improved. After this improvement, water droplets existing on light transmission window 51 cause the SN ratio of the received signal and the wind velocity acquisition ratio to be decreased and accordingly the wiper is made to operate. Such an operation is repeated. It is determined whether precipitation falls or not and, when it is determined that precipitation falls, the wiper is made to operate without using the washer fluid. In this way, the wind velocity acquisition ratio is maintained at a desired level without consuming the washer fluid when precipitation falls. A resultant effect is that the wind velocity vector is measured at a desired level of the wind velocity acquisition ratio, even when precipitation falls, without shortening the intervals for supplying the washer fluid. Moreover, it is possible to lower the probability of occurring such period in that all of the washer fluid is consumed and measurement the wind velocity acquisition ratio cannot be performed. Even when such a period is occurred, the interval to the next supply of the washer fluid is shortened, as compared with the conventional lidar apparatus.

According to the present disclosure, exhaustion of the washer fluid is prevented without lowering the wind velocity acquisition ratio when precipitation falls. Conventionally, the frequency of the regular inspection (supply) of the washer fluid is once per week as the most frequent value. According to the present disclosure, the intervals at which the washer fluid is regularly checked (supplied) are expected to be extended to one month or more. Therefore, in an environment (such as mountaintop, on a float on the sea, or the like) where it is difficult to increase the frequency of the regular check, the lidar apparatus can be installed with a high wind velocity acquisition ratio maintained.

Since the wind direction condition that the wind direction is downward direction is also considered, it is possible, when the wind velocity acquisition ratio decreases under the condition that wind blows upward and thus there is a high probability that precipitation does not fall, to remove foreign matter from the external surface of light transmission window 51 using the washer fluid.

As to the precipitation determination condition, one of or both the wind direction condition and the SN ratio decrease condition may not be considered. In order to recover from erroneous detection of falling precipitation in the case where precipitation does not fall, the wiper may be made to operate with using the washer fluid, when improvement of the SN ratio or the wind velocity acquisition ratio is not detected after operation of the wiper without using the washer fluid.

In the first embodiment, whether or not the wiper operation is necessary is determined chiefly based on the wind velocity acquisition ratio, while the SN ratio is used in expressing the precipitation determination condition. Alternatively, it may be determined that precipitation falls, without using the wind velocity acquisition ratio, on the condition that decrease of the SN ratio to less than a predetermined decrease threshold and improvement of the SN ratio as a result of the wiper operation are repeated while the wiper is made to operate within intervals of W3. The wiper operation interval condition may be expressed in any way as long as the condition can detect such situation in that decrease to less than a predetermined decrease threshold after an improvement brought by the wiper operation within a predetermined second period (W3) for at least one of the measurement success or failure result and the SN ratio are repeated a predetermined number of times or more.

From at least one of the SN ratio and the measurement success or failure result, that is, whether the wind velocity vector is measured or not, and from the wiper's operation in the first period, it may be determined whether or not precipitation exists on the external surface of the light transmission window. In the present embodiment, the first period is twice of W3.

The lidar apparatus may be used for a different purpose from measuring the wind velocity vector. In this case, the signal processor processes the received signal. The precipitation determiner may be changed to determine whether or not precipitation exists on the external surface of the light transmission window, from the SN ratio of the received signal and the wiper's operation in the first period.

The above is applied to other embodiments as well.

Second Embodiment

In the first embodiment, there is only one operating state of Under Monitoring. In a second embodiment, multiple operating states of Under Monitoring are distinguished from one another depending on whether or not there is a possibility that the wiper operation interval condition is satisfied. For determining whether or not the wiper operation is necessary and the type of wiper operation, the multiple operating states of Under Monitoring are used. In the second embodiment, the wiper is made to operate in the same way as the first embodiment under the same circumstances, while the method for determining the precipitation determination condition is different. It is supposed that the relation $Ws<W2<W3$ holds in this embodiment.

The precipitation determination condition is required to be determined by considering the past history. In order to express simply the precipitation determination condition considering the past history, operating states are defined in the following way.

Under Monitoring: The state where K=Normal holds, there is no possibility that the precipitation determination condition is satisfied, and Tw is not measured or $W3>Tw \geq W2$ holds.

Under Monitoring A: The state where K=Normal holds, there is no possibility that the precipitation determination condition is satisfied, and $Tw<W2$ holds.

Under Monitoring B: The state where K=Normal holds, the wiper operation interval condition and the wind direction condition are satisfied, and there is a possibility that the SN ratio decrease condition is satisfied, however, the SN ratio decrease condition is not satisfied.

Under Monitoring C: The state where K=Normal holds, and the wiper operation interval condition, the wind direction condition, and the SN ratio decrease condition are satisfied.

Under Monitoring or Under Monitoring A or Under Monitoring B or Under Monitoring C are referred to as "Under-Monitoring States."

A lidar apparatus in the second embodiment has a similar functional configuration to the first embodiment. A precipitation determiner 29A (not shown) of a wiper operation controller 28A (not shown) in the second embodiment uses these operating states to determine the precipitation determination condition. The precipitation determination condition using these operating states can be expressed in the following way.

Precipitation determination condition=(preceding operating state $Rp$ is Under Monitoring $C[Rp$=Under Monitoring $C]$, or (preceding operating state $Rp$ is Under Monitoring $B[Rp$=Under Monitoring $B]$, and the SN ratio decrease condition is satisfied $[Js$=Satisfied]))

AND the current operating state $Rn$ is Worse Detected or Impossible Detected $[Rn$=Worse Detected or Impossible Detected])

In the case where the preceding operating state is Under Monitoring B, it is checked whether or not the SN ratio decrease condition is satisfied. If satisfied, it is determined that precipitation falls.

In order to express the wiper operation interval condition, the following variables are defined. Ty used in the first embodiment is not used.

Nw=The number of times the wiper is successively made to operate within intervals of W3.

Hw: A threshold for Nw. Hw is twice for example.

The wiper operation interval condition is expressed as follows.

Wiper operation interval condition=
(the number of times the wiper is successively made to operate within intervals of W3 is equal to or more than Hw [Nw≥Hw],
and
W3 has not elapsed since the latest wiper operation [Tw<W3])

In the case where Nw<Hw holds, there is no possibility that the wiper operation interval condition is satisfied. In the case where Nw≥Hw holds, when W3 has elapsed [Tw≥W3], there becomes no possibility that the wiper operation interval condition is satisfied.

The number of times Nw the wiper is successively made to operate within intervals of W3 is set as follows. The initial value is Nw=0. When the wiper is made to operate while Nw=0, the variable is set as Nw=1 and measurement of Tw is started. When the wiper operates before W3 has elapsed [Tw<W3], the variable is set as Nw=Nw+1, the variable Tw is reset to Tw=0 and Tw is measured. If an operator gives an instruction to cause the wiper to operate and the wiper is made to operate in response thereto, the variable is set as Nw=1 rather than Nw=Nw+1. When W3 has elapsed [Tw≥W3] without wiper operation, the variable is set as Nw=0 and measurement of Tw is stopped.

Figure 12:
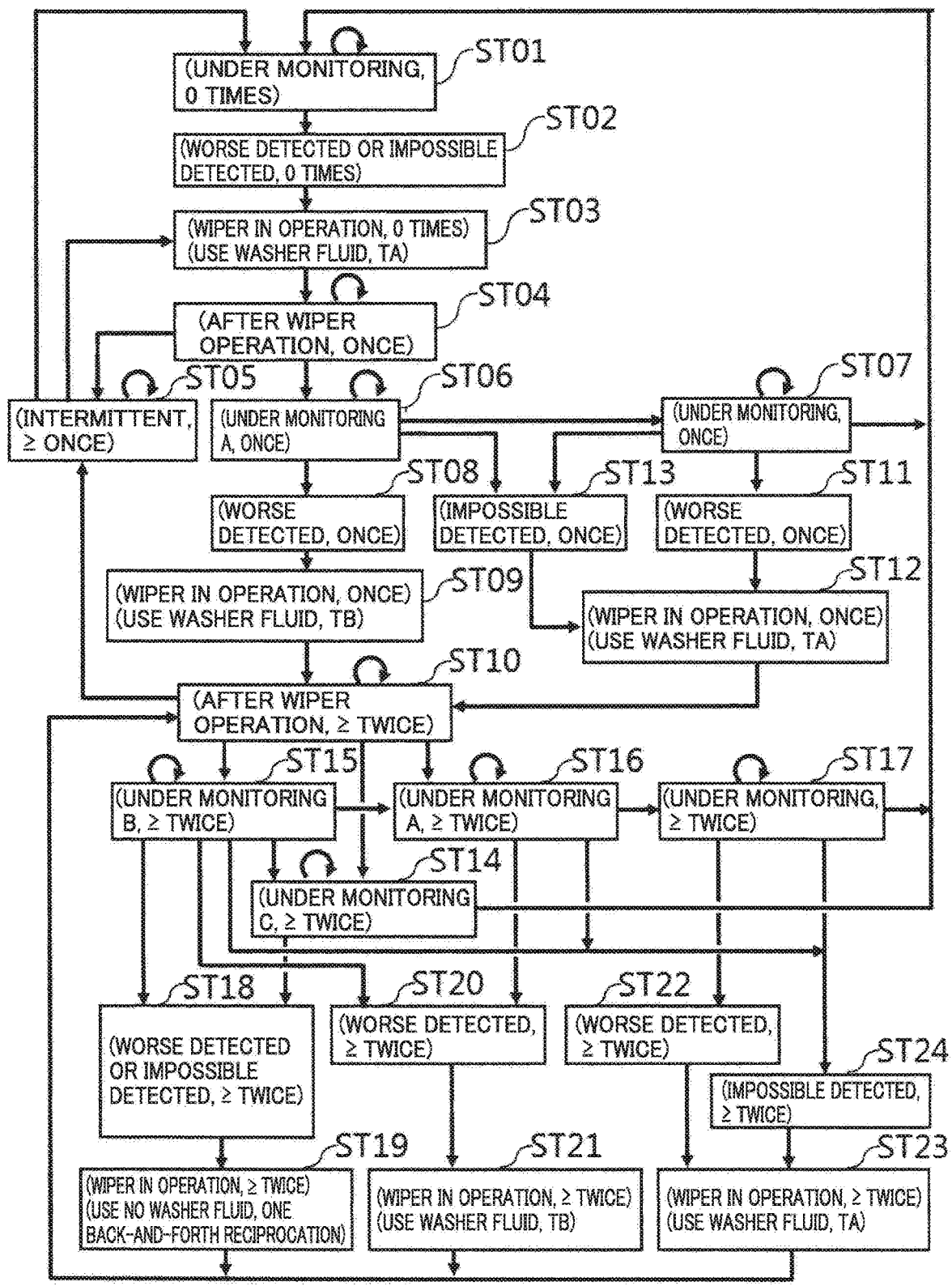
FIG. 12 is a state transition diagram illustrating an operation of a lidar apparatus according to a second embodiment of the present disclosure.

FIG. 12 is a state transition diagram illustrating an operation of the lidar apparatus according to the second embodiment. In the state transition diagram of FIG. 12, each state is expressed as "(Rn, Nw)." In the case of Rn=Wiper in Operation, the operating time and whether the washer fluid is used or not are also indicated. The number of times Nw the wiper is successively made to operate within intervals of W3 is expressed as "≥once" if once or more, and as "≥twice" if twice or more.

In response to change of the operating state to Rn=Worse Detected or Impossible Detected, the wiper is made to operate for normal time TA when Nw=0 holds. When Nw=1 holds, the wiper is made to operate for TA or short time TB. When Nw≥2 holds, the wiper is made to operate for TA or TB or in one back-and-forth reciprocation. In order to change the number of different types of wiper operations depending on Nw, the number of "Under-Monitoring States" is changed as Nw changes.

The states from ST01 to ST05 are identical to those in FIG. 6. However, ST01 in FIG. 12 is treated as a state where Nw=0 holds. In ST05 where Rn=Intermittent holds, it is supposed that NW≥1 holds. When K=Normal is detected in state ST04 "(After Wiper Operation, once)," the state changes to state ST06 "(Under Monitoring A, once)." When Tw≥W2 holds without detecting K=Worse or Impossible in state ST06, the state changes to state ST07 "(Under Monitoring, once)." Further, when Tw≥W3 holds, the state returns to state ST01 "(Under Monitoring, 0 times)."

When K=Worse is detected in state ST06, the state changes to state ST08 "(Worse Detected, once)," then changes to state ST09 corresponding to the wiper operation for short time TB, and further changes to state ST10 "(After Wiper Operation, ≥twice)." When K=Worse is detected in state S07, the state changes to state ST11 "(Worse Detected, ≥twice)," then changes to state ST12 corresponding o the wiper operation for normal time TA, and further changes to state ST10. When K=Impossible is detected in state ST06 or ST07, the state changes to state ST12 corresponding to the wiper operation for TA, and further changes to state ST10.

In the case where K=Normal is not detected in state ST10 "(After Wiper Operation, ≥twice)" before T3 has elapsed since the wiper operation, the state changes to state ST05 "(Intermittent, ≥once)." In state ST10, when the wind direction condition and the SN ratio decrease condition are satisfied and K=Normal is detected before T3 has elapsed, the state changes to state ST14 "(Under Monitoring C, ≥twice)." When K=Normal is detected before T3 has elapsed while the wind direction condition is satisfied and the SN ratio decrease condition is not satisfied, the state changes to state ST15 "(Under Monitoring B, ≥twice)." When K=Normal is detected before T3 has elapsed while the wind direction condition is not satisfied, the state changes to state ST16 "(Under Monitoring A, ≥twice)."

In state ST15, when the SN ratio decrease condition is satisfied before Ws has elapsed, the state changes to state ST14. When the SN ratio decrease condition is not satisfied before Ws has elapsed, the state changes to state ST16. In state ST16, when W2 has elapsed while K=Worse or Impossible is not detected, the state changes to state ST17 "(Under Monitoring, ≥twice)." In state ST17 or ST14, when W3 has elapsed while K=Worse or Impossible is not detected, the state changes to state ST01.

In state ST15, when the measurement state K=Worse or Impossible is detected, the state changes to state ST18 "(Worse Detected or Impossible Detected, ≥twice)." In state ST14, when the measurement state K=Worse or Impossible is detected, it is checked whether or not the SN ratio decrease condition is satisfied. When the SN ratio decrease condition is satisfied, the state changes to state ST18. Since state ST18 is a state where the precipitation determination condition is satisfied, the state changes to state ST19 in which the wiper is made to operate in only one back-and-forth reciprocation without using the washer fluid.

In state ST14, when K=Worse is detected and the SN ratio decrease condition is not satisfied, the state changes to state ST20 "(Worse Detected, ≥twice)." In state ST16, when K=Worse is detected as well, the state changes to state ST20. From state ST20, change is made to state ST21 corresponding to the wiper operation for short time TB. When K=Worse is detected in state ST17, the state changes to state ST22 "(Worse Detected, ≥twice)." The state changes from state ST22 to the state S23 corresponding to the wiper operation for normal time TA.

In state ST14, when K=Impossible is detected and the SN ratio decrease condition is not satisfied, the state changes to state ST24 "(Impossible Detected, ≥twice)." When K=Impossible is detected in state ST16 or ST17 as well, the state changes to state ST24. State ST19 or ST21 or ST23 which is the state "Wiper in Operation" changes to state ST10 "(After Wiper Operation, ≥twice) when the wiper operation is ended.

Figure 13:
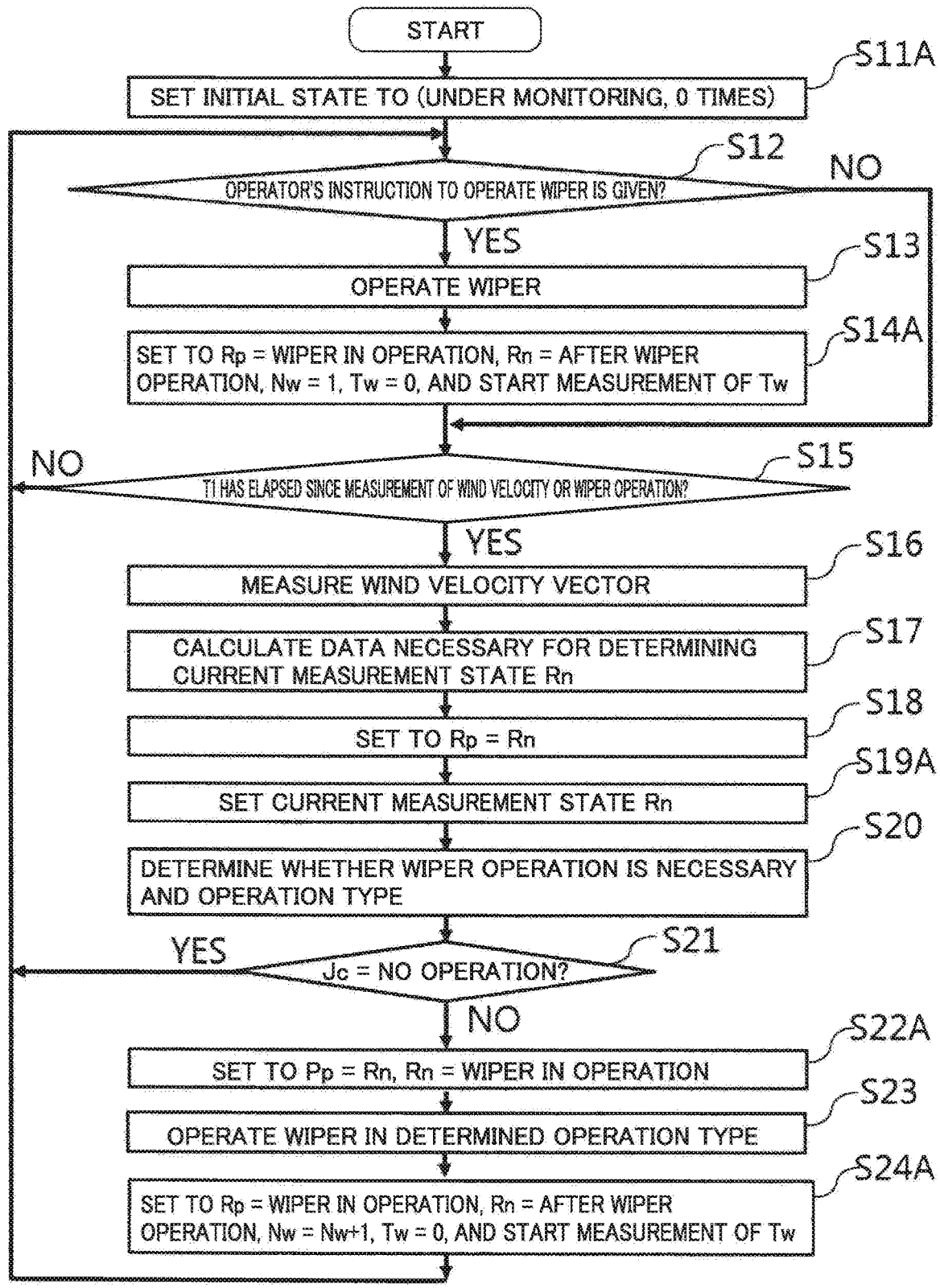
FIG. 13 is a flowchart illustrating an operation of the lidar apparatus according to the second embodiment.

FIG. 13 is a flowchart illustrating an operation of the lidar apparatus according to the second embodiment. FIG. 13 differs from FIG. 7 in the first embodiment in that Nw is used while Ty is not used in FIG. 13.

In step S11A, the initial state is set to "(Under Monitoring, 0 times)." In step S14A, Nw is also set as Nw=1. In step S22A, Ty is not set as Ty=Tw. In S19A, while the setting of the current operating state Rn is just Rn=Under Monitoring in the first embodiment, the setting is changed by adding some conditions so that the current operating state Rn may be set to Under Monitoring, Under Monitoring A, Under Monitoring B, or Under Monitoring C. The process flow for setting of the current operating state Rn is omitted.

Figure 14:
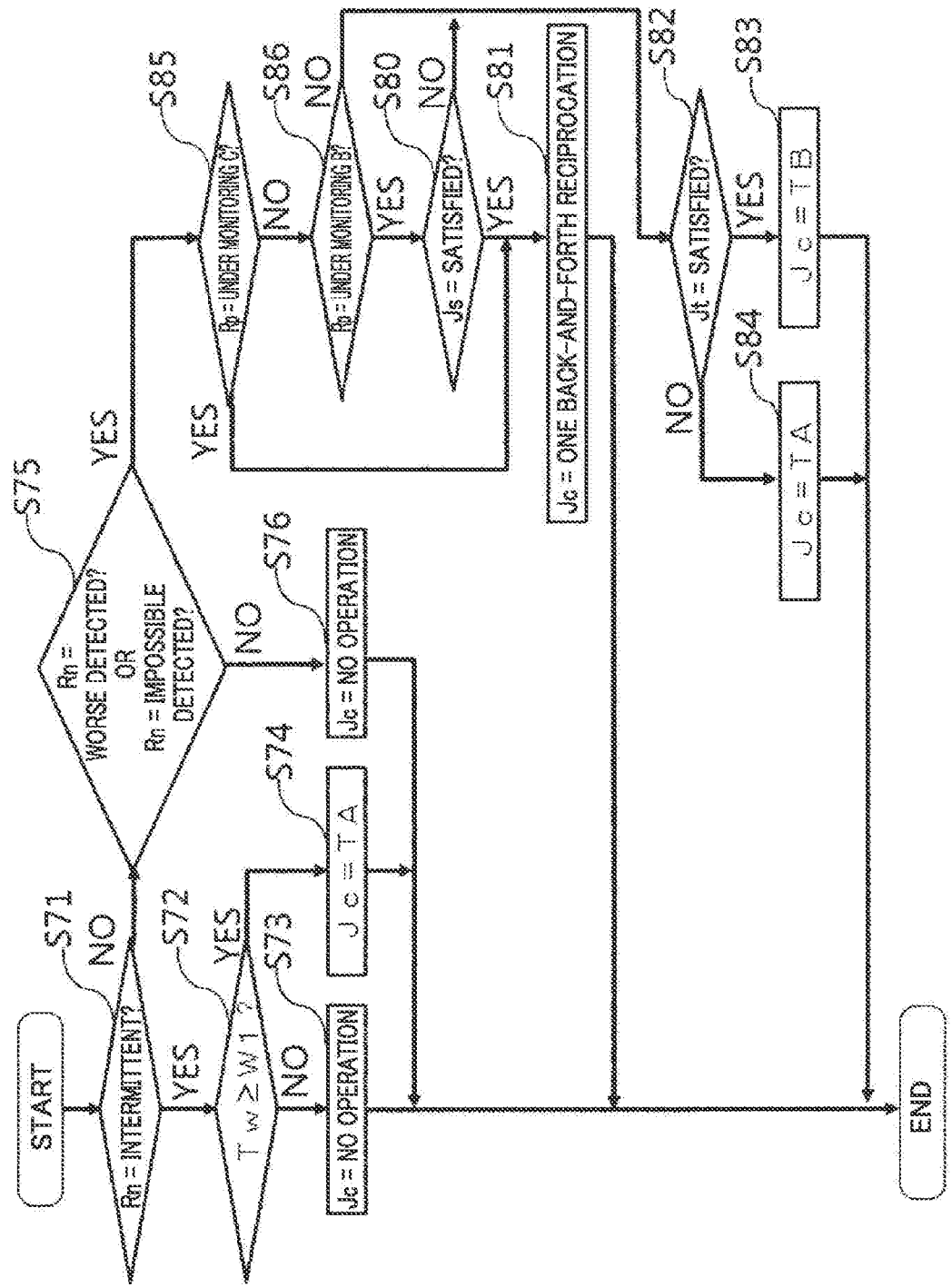
FIG. 14 is a flowchart illustrating an operation of an example of the process for determining whether or not a wiper operation is necessary and the type of operation by the lidar apparatus according to the second embodiment.

The process for determining whether or not the wiper operation is necessary and the type of operation performed in S20A is described with reference to FIG. 14. FIG. 14 is a flowchart illustrating an operation of an example of the process for determining whether or not the wiper operation is necessary and the type of operation by the lidar apparatus according to the second embodiment.

Only the differences from FIG. 10 in the first embodiment is described. S77 and S78 regarding whether or not the wiper operation interval condition is satisfied are replaced with steps S85 and S86 expressed by the conditions as to the preceding operating state Rp. When Rn is Worse Detected or Impossible Detected (YES in S75), it is checked in step S85 whether or not Rp is Under Monitoring C. When Rp is not Under Monitoring C (No in S85), it is checked in step S86 whether or not Rp is Under Monitoring B. When Rp is Under Monitoring B (YES in S86), it is checked in step S80 whether or not the SN ratio decrease condition is satisfied [Js=Satisfied?]. When the SN ratio decrease condition is satisfied (YES in S80) and when Rp is Under Monitoring C (YES in S85), the variable is set as Jc=one back-and-forth reciprocation in step S81. When the SN ratio decrease condition is not satisfied (NO in S80) and when Rp=Under Monitoring B does not hold (NO in S86), the process proceeds to step S82.

In the second embodiment, the wiper is made to operate in the same way as the first embodiment under the same circumstances. In the second embodiment as well, exhaustion of the washer fluid is prevented without lowering the wind velocity acquisition ratio during rainfalls.

In the second embodiment, among the conditions for determining whether the precipitation determination condition is satisfied or not, any condition which can be determined before detecting measurement state K=Worse or Impossible is determined. Then, the monitoring states are classified depending on whether or not there is a possibility that the precipitation determination condition is satisfied. In this way, when measurement state K=Worse or Impossible is detected, the precipitation determination condition can be calculated with a smaller amount of calculation as compared with the first embodiment.

Third Embodiment

A third embodiment is implemented by modifying the first embodiment so that the wind direction condition is not considered in the precipitation determination condition. Further, in order to recover from erroneous detection of precipitation in the case where precipitation does not fall, the wiper is made to operate while the washer fluid is used, in the case where it is determined that precipitation causes the wiper to operate without the washer fluid but the wind velocity acquisition ratio or the SN ratio is not improved. Whether or not precipitation falls may be determined as determined in the second embodiment.

Figure 15:
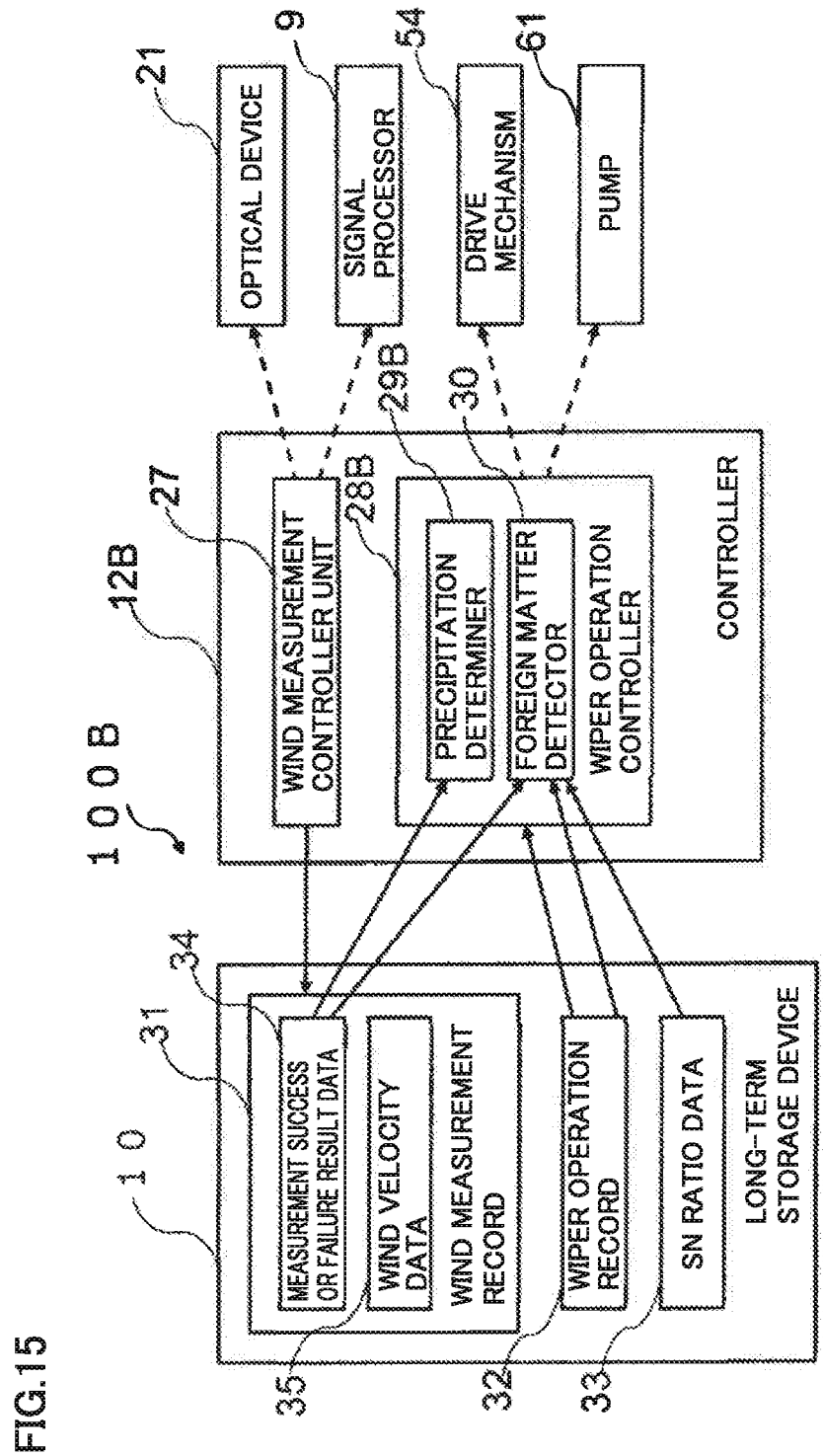
FIG. 15 is a functional block diagram illustrating a functional configuration of a lidar apparatus according to a third embodiment of the present disclosure.

FIG. 15 is a functional block diagram illustrating a functional configuration of a lidar apparatus according to the third embodiment of the present disclosure. A wiper operation controller 28B in the third embodiment determines whether or not the wiper operation is necessary and the type of operation without referring to wind velocity data 35.

A precipitation determiner 29B of wiper operation controller 28B uses the following precipitation determination condition.

Precipitation determination condition=(current operating state is Worse Detected or Impossible Detected [Rn=Worse Detected or Impossible Detected], and W3 has not elapsed since the latest wiper operation [Tw<W3], and the interval from the second latest wiper operation to the latest wiper operation is less than W3 [Ty<W3]

and the SN ratio decrease condition is satisfied [Js=Satisfied])

Figure 16:
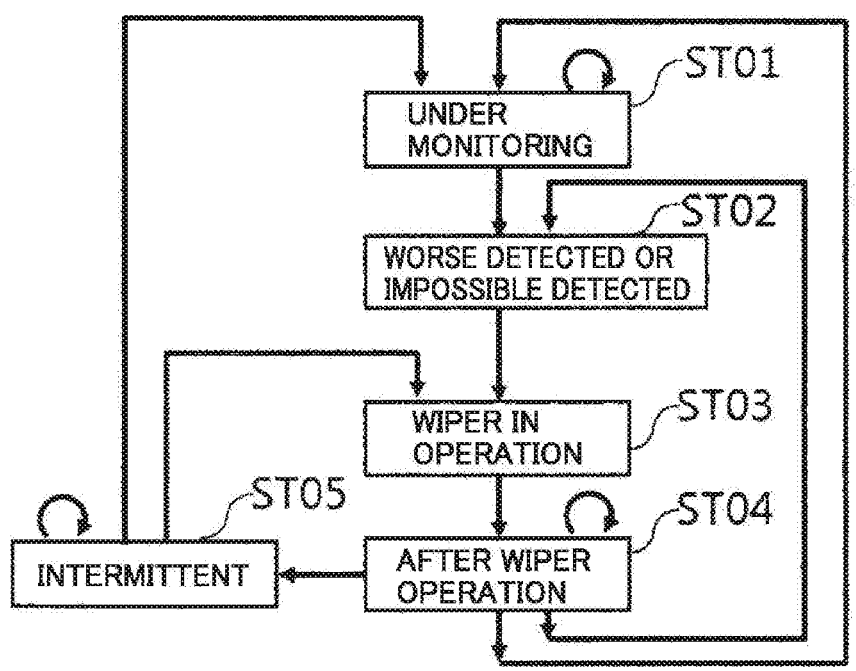
FIG. 16 is a state transition diagram illustrating an operation of the lidar apparatus according to the third embodiment.

FIG. 16 is a state transition diagram illustrating an operation of the lidar apparatus according to the third embodiment of the present disclosure. A route returning to state ST02 in which Rn=Worse Detected or Impossible Detected from state ST04 in which Rn=After Wiper Operation is added. In the case where measurement state K does not return to Normal before T3 has elapsed since the wiper operation and the latest wiper operation is one back-and-forth reciprocation, the state changes to state ST02. In the case where the latest wiper operation is not one back-and-forth reciprocation, the state changes to state ST05 in which Rn=Intermittent.

Operating states in the third embodiment are defined in the following way. The states: Impossible Detected, Worse Detected, and Intermittent are different from those in the first embodiment.

Under Monitoring: The state where measurement state K is Normal.

Impossible Detected: The state where K=Impossible is detected during the Under Monitoring state, or K=Impossible holds when T3 has elapsed since the wiper is made to operates in one back-and-forth reciprocation.

Worse Detected: The state where K=Worse is detected during Under Monitoring state, or K=Worse holds when T3 has elapsed since the wiper operates to make one back-and-forth reciprocation.

Wiper in Operation: The state where the wiper is operating.

After Wiper Operation: The state where K=Worse or Impossible holds before the time when T3 has elapsed from the latest wiper operation.

Intermittent: The state where K=Worse or Impossible holds when T3 has elapsed since the wiper operation other than one back-and-forth reciprocation.

Figure 17:
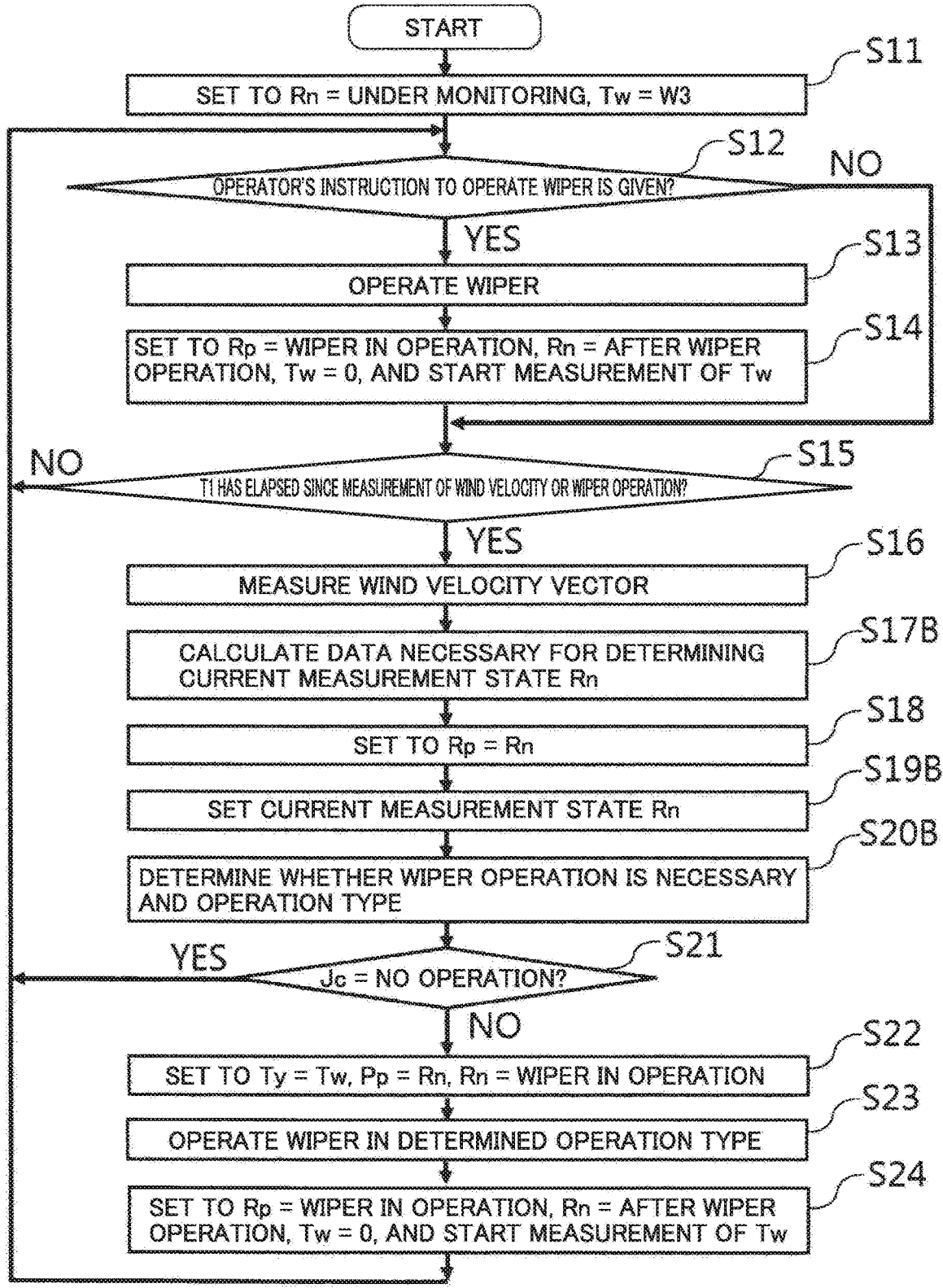
FIG. 17 is a flowchart illustrating an operation of the lidar apparatus according to the third embodiment.

An operation is described. FIG. 17 is a flowchart illustrating the operation of the lidar apparatus according to the third embodiment. Only the differences from FIG. 7 in the first embodiment is described. The process in S17B for calculating data necessary for determining the current operating state, the process in S19B for setting the current operating state Rn, and the process in step S20B for determining whether or not the wiper operation is necessary and the type of operation differ from those in the first embodiment.

Figure 18:
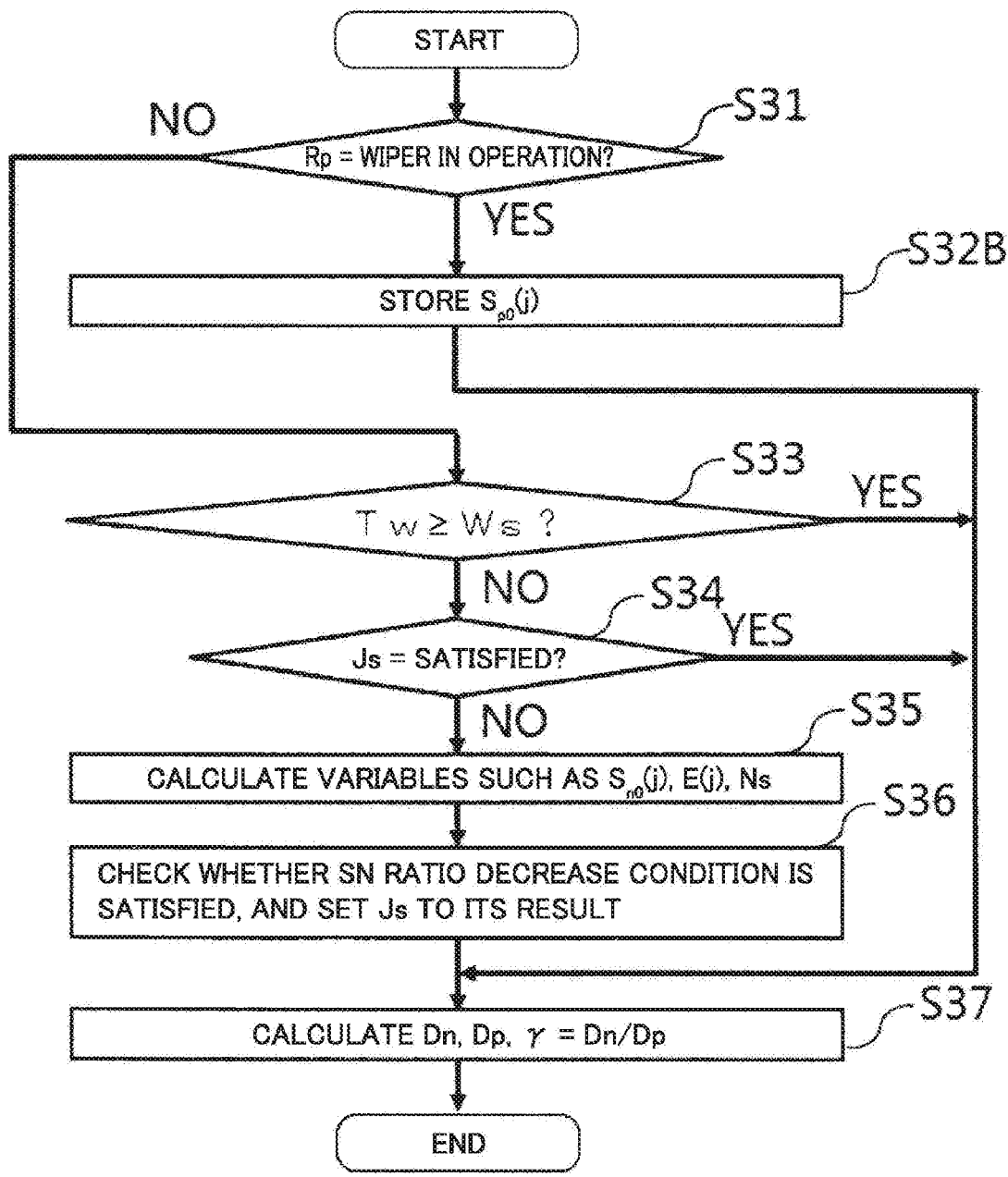
FIG. 18 is a flowchart illustrating an operation of an example of the process for calculating data necessary for determining the current operating state by the lidar apparatus according to the third embodiment.

FIG. 18 is a flowchart illustrating an operation of an example of the process for calculating data necessary for determining the current operating state by the lidar apparatus according to the third embodiment. Only the difference from FIG. 8 in the first embodiment is described. In step S32B, $S_{p0}(j)$ is stored.

Figure 19:
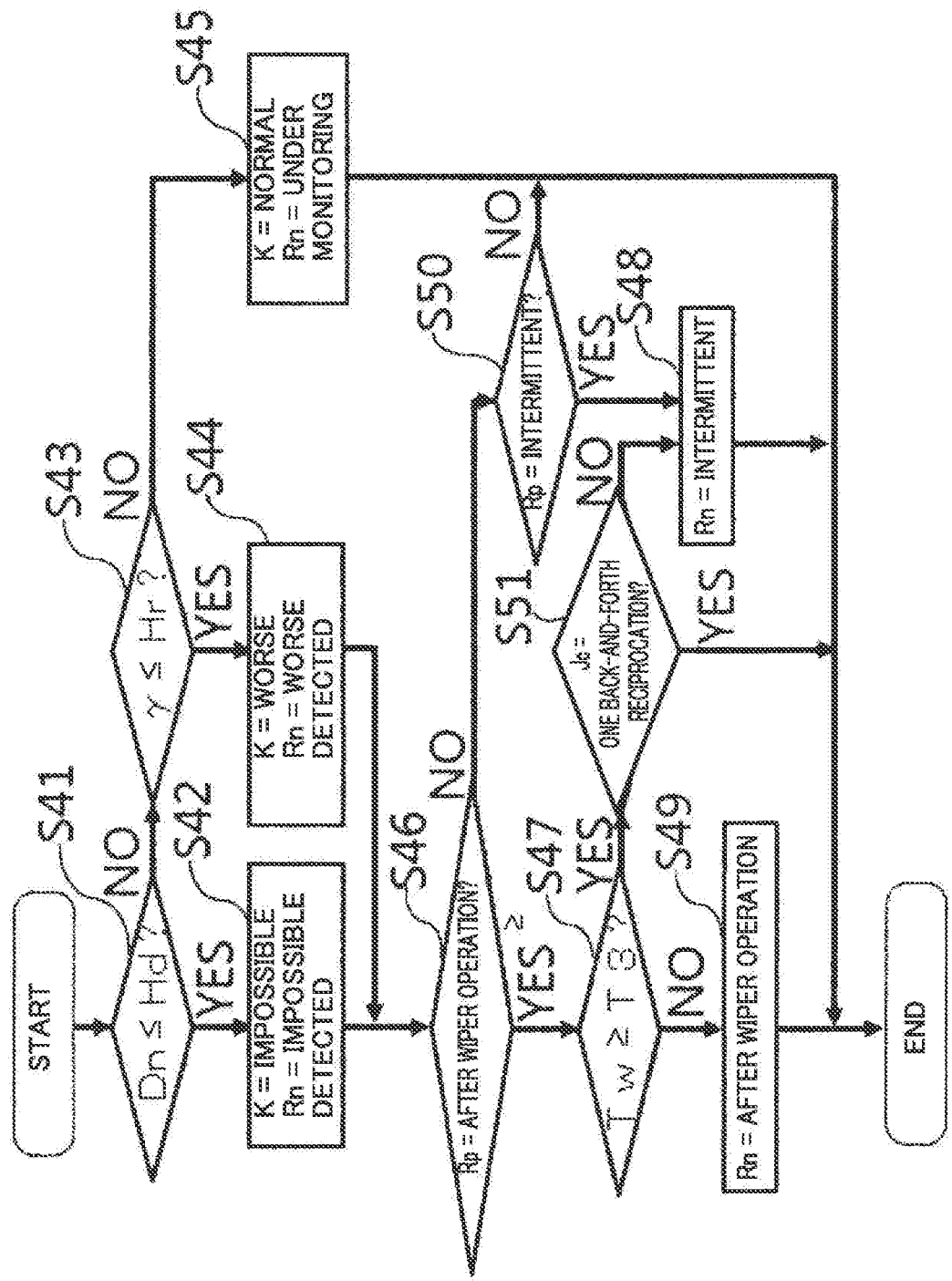
FIG. 19 is a flowchart illustrating an operation of an example of the process for determining an operating state by the lidar apparatus according to the third embodiment.

FIG. 19 is a flowchart illustrating an operation of an example of the process for determining the operating state by the lidar apparatus according to the third embodiment. Only the differences from FIG. 9 in the first embodiment is described.

When Tw≥T3 holds (YES in S47), it is checked in step S51 whether or not the latest wiper operation is one back-and-forth reciprocation [Jc=one back-and-forth reciprocation?]. When the latest wiper operation is one back-and-forth reciprocation (YES in S51), the process is ended. Accordingly, the state: Impossible Detected set in S42 or the state: Worse Detected set in S44 remains as it is in Rn. When the latest wiper operation is not one back-and-forth reciprocation (NO in S51), the variable is set as Rn=Intermittent in step S48. Jc holds the preceding value before it is set in S20A.

Figure 20:
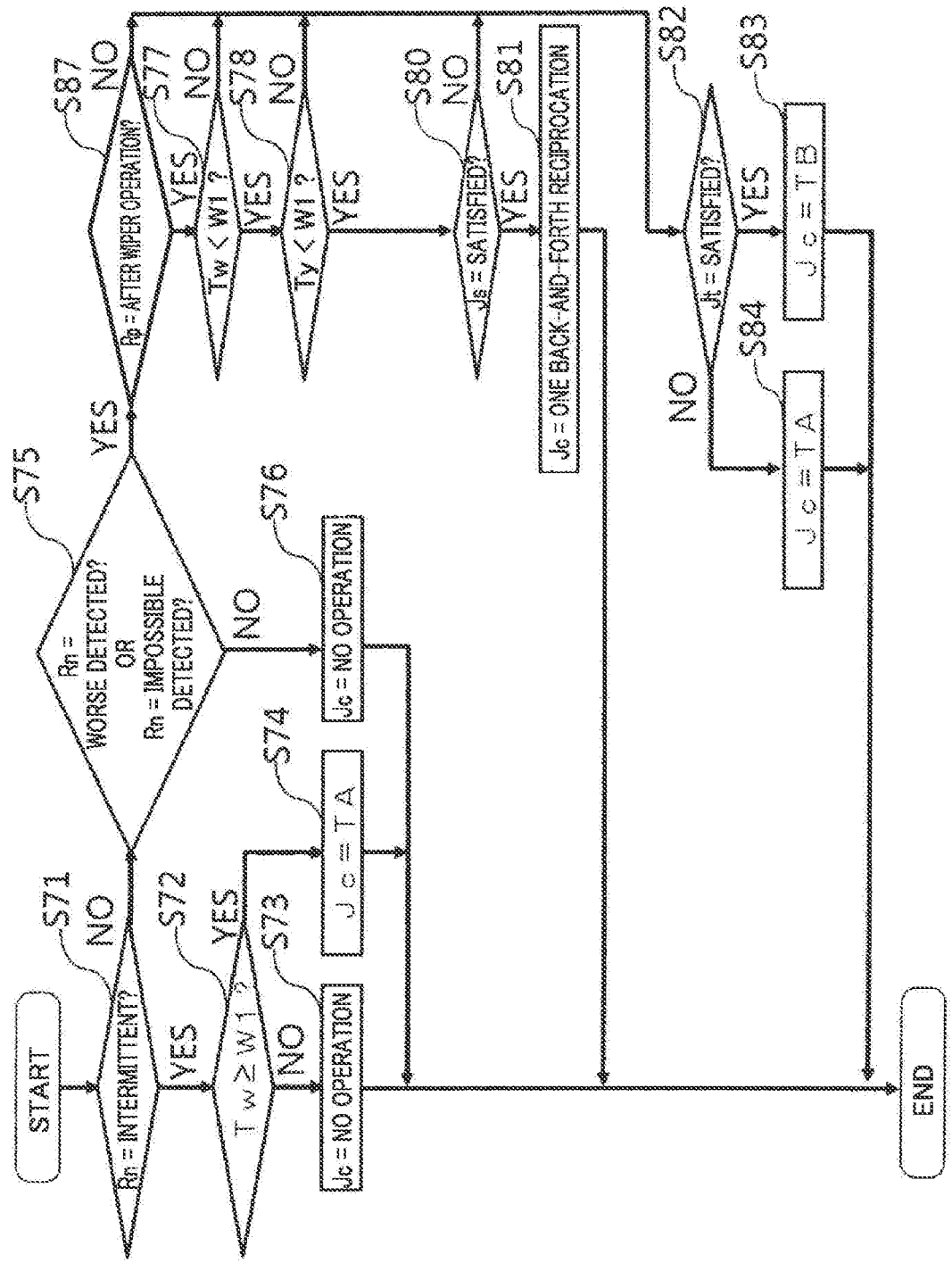
FIG. 20 is a flowchart illustrating an operation of an example of the process for determining whether or not a wiper operation is necessary and the type of operation by the lidar apparatus according to the third embodiment.

FIG. 20 is a flowchart illustrating an operation of an example of the process for determining whether or not the wiper operation is necessary and the type of operation by the lidar apparatus according to the third embodiment. Only the differences from FIG. 10 in the first embodiment is described. When Rn is Worse Detected or Impossible Detected (YES in S75), it is checked in step S87 whether or not the preceding operating state Rp is After Wiper Operation. When Rp is not After Wiper Operation (NO in S87), S77 is performed. S87 is added so that the wiper is made to operate while the washer fluid is used, when the state changes from Rp=After Wiper Operation to Rn=Worse Detected or Impossible Detected. When Rp is After Wiper Operation (YES in S87), it is checked in step S82 whether or not the short time operation condition is satisfied.

In the third embodiment, the wind direction condition is not used in determining whether precipitation falls or not, and therefore, step S79 is not provided. When Ty is less than W3 (YES in S78), it is checked in step S80 whether or not the SN ratio decrease condition is satisfied [Js=Satisfied?].

Since the wind direction condition is not considered in determining whether or not precipitation falls, it can be determined that precipitation falls when the speed of wind blowing downward is low and this wind is measured erroneously as wind blowing upward due to a measurement error.

In the third embodiment, in the case where the wiper is made to operate without using the washer fluid and thereafter measurement state K does not return to Normal when T3 has elapsed, the wiper is made to operate while the washer fluid is used. In this way, when it is determined that precipitation falls under the condition that the wind velocity acquisition ratio is lowered due to foreign matter, the wiper can be made to operate with using the washer fluid, in order to remove the foreign matter immediately. In the case where the wind direction condition is used in precipitation determination condition, the wiper may be made to operate while the washer fluid is used, in the case where the wiper is made to operate without using the washer fluid and thereafter measurement state K does not return to Normal when T3 has elapsed.

Instead of measurement state K, the wind velocity acquisition ratio or the SN ratio at one measurement timing or in a predetermined period may be used to determine whether or not it is necessary, after the wiper is made to operate without using the washer fluid, to cause the wiper to operate while using the washer fluid (referred to as wiper's re-operation). A threshold different from the threshold for determining that measurement state K is Worse or Impossible may be used to determine whether or not the wiper's re-operation is necessary. After the wiper is made to operate without using the washer fluid, it is monitored in a predetermined sixth period whether or not at least one of the SN ratio and the measurement success or failure result, that is, whether or not the wind velocity vector is measured, becomes equal to or more than an improvement determining threshold. When it is detected that the SN ratio and measurement success or failure result which are monitored are kept to be less than the improvement determining threshold in the sixth period, the wiper operation controller may cause the wiper to operate while the washer fluid is used. The sixth period is determined to be matched with T3.

The things explained above are applied to other embodiments as well.

Fourth Embodiment

Figure 21:
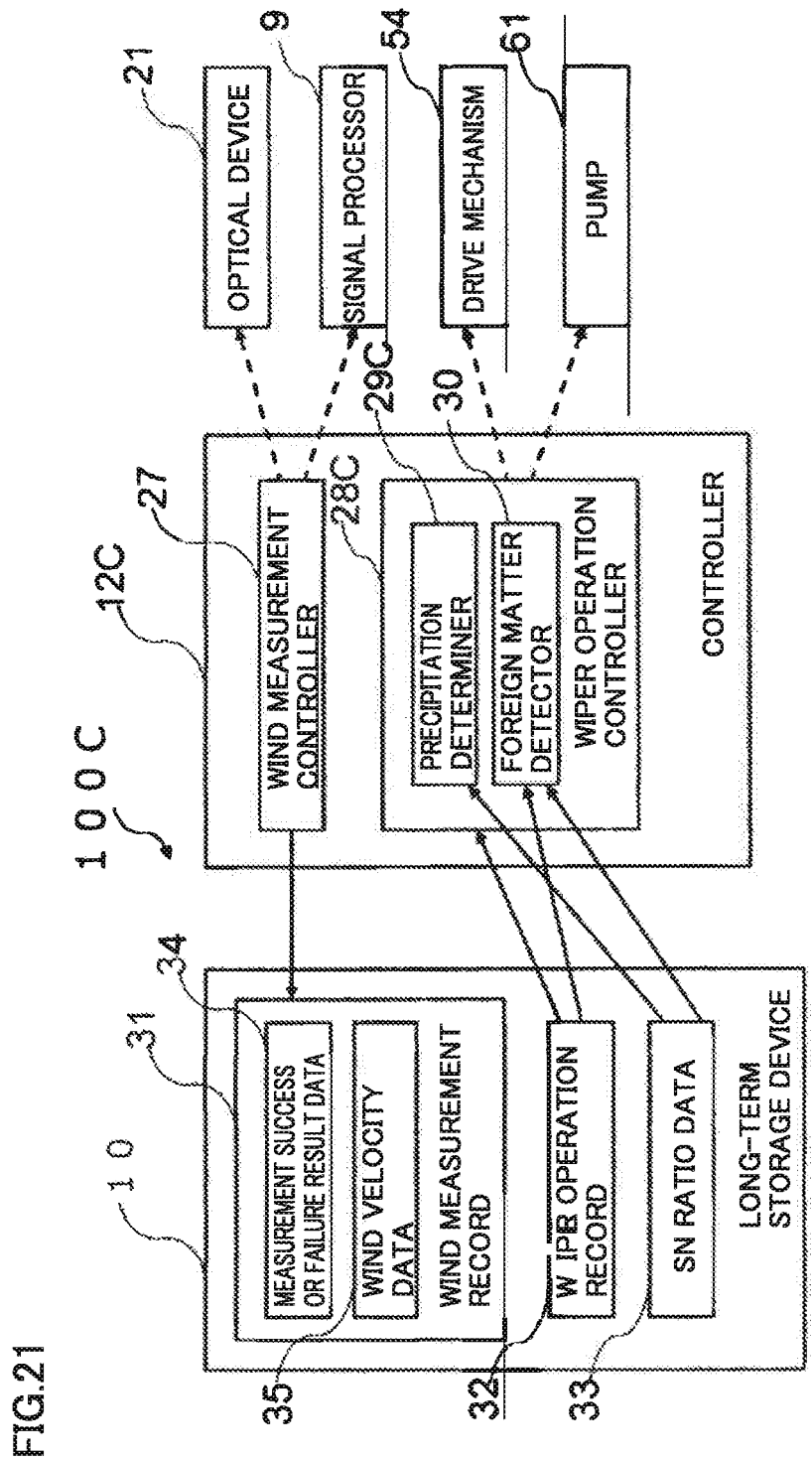
FIG. 21 is a functional block diagram illustrating a functional configuration of a lidar apparatus according to a fourth embodiment of the present disclosure.

A fourth embodiment is implemented by modifying the first embodiment so that the measurement state is determined based on the SN ratio of the received signal. FIG. 21 is a functional block diagram illustrating a functional configuration of a lidar apparatus according to the fourth embodiment of the present disclosure. Only the differences from FIG. 5 in the first embodiment are described.

A wiper operation controller 28C in the fourth embodiment determines whether or not the wiper operation is necessary and the type of operation based on decrease of the SN ratio of each beam and the intervals at which the wiper is made to operate, without referring to measurement success or failure result data 34.

The precipitation determination condition and the condition for detecting the presence of foreign matter on the external surface of the light transmission window which are expressed with the SN ratio can be defined similarly to those expressed with the measurement success or failure result. In the case where the SN ratio is used to express these conditions, it is possible to detect the presence of foreign matter (including precipitation) on the external surface of the light transmission window and thereby causes the wiper to operate, before it becomes impossible to measure the wind velocity vector by defining a threshold for the SN ratio having an appropriate allowance with respect to a value at which measurement of the wind velocity vector becomes impossible. In this way, the wind velocity acquisition ratio is increased as compared with the case where the wiper is made to operate after detecting that the wind velocity vector cannot be measured.

For the present disclosure, the embodiments can freely be combined or modification or omission of each embodiment can be made within the scope of the spirit of the disclosure.

REFERENCE SIGNS LIST 100, 100A, 100B, 100C lidar apparatus (wind measurement apparatus)
1 optical oscillator
2 optical coupler
3 optical modulator
4 optical circulator
5 optical transmitter/receiver
6 mixing coupler
7 optical receiver
8 A/D converter
9 signal processor (wind velocity measurer, signal-to-noise ratio calculator)
10 long-term storage device (wind velocity storage)
11 display
12, 12B, 12C controller
20 optical casing
21 optical device
22 CPU
23 volatile memory
24 nonvolatile memory 25 circuit board
26 hard disk
27 wind measurement controller
28, 28A, 28B, 28C wiper operation controller
29, 29A, 29B, 29C precipitation determiner
30 foreign matter detector
31 wind measurement record
32 wiper operation record
33 SN ratio data
34 measurement success or failure result data
35 wind velocity data
40 vector representing the direction of beam 0
41 vector representing the direction of beam 1
42 vector representing the direction of beam 2
43 vector representing the direction of beam 3
44 vector representing the direction of beam 4
50 casing
51 light transmission window
52 wiper
53 rotational shaft
54 drive mechanism
55 blade
56 frame
57 washer fluid pipe (washer fluid supplier)
58 washer fluid supply hole (washer fluid supplier)
60 washer fluid tank (washer fluid supplier)
61 pump (washer fluid supplier)
62 washer fluid supply pipe (washer fluid supplier)
63 washer fluid inlet (washer fluid supplier)

The invention claimed is:

1. A wind measurement apparatus comprising:
an optical device to emit a laser light into a space and to process a reflected light being the laser light reflected from the space;
a casing to house the optical device;
a light transmission window, provided in the casing, to transmit the laser light and the reflected light;
a wiper to remove foreign matter existing on an external surface of the light transmission window;
a washer fluid supplier to supply a washer fluid to the external surface of the light transmission window;
a wind velocity measurer to measure a wind velocity vector in the space, from a received signal obtained by photoelectric conversion of the reflected light;
a wind velocity storage to store a measurement success or failure result being an indicator representing whether or not the wind velocity vector is measured by the wind velocity measurer and the measured wind velocity vector;
a signal-to-noise ratio calculator to calculate a signal-to-noise ratio of the received signal;
a foreign matter detector to detect, based on at least one of the measurement success or failure result and the signal-to-noise ratio, the foreign matter existing on the external surface of the light transmission window, the foreign matter hindering the laser light and the reflected light from passing through the light transmission window;
a precipitation determiner to determine
whether precipitation, included in the foreign matter, exists on the external surface of the light transmission window based on a time elapsed since the latest wiper operation, when the foreign matter detector detects the foreign matter, and
that the precipitation does not exist, when the foreign matter detector does not detect the foreign matter; and
a wiper operation controller to cause
the wiper to operate and the washer fluid supplier not to operate, when the precipitation determiner determines that the precipitation exists, and
the washer fluid supplier and the wiper to operate, when the precipitation determiner does not determine that the precipitation exists and the foreign matter detector detects that the foreign matter exists.

2. The wind measurement apparatus according to claim 1, wherein
when the wiper operation controller causes the wiper to operate and the washer fluid supplier not to operate and thereafter at least one of the measurement success or failure result and the signal-to-noise ratio does not become equal to or higher than a predetermined improvement determining threshold, the wiper operation controller causes the washer fluid supplier and the wiper to operate.

3. The wind measurement apparatus according to claim 2, wherein
when a wiper operation interval condition is satisfied, the precipitation determiner determines that the precipitation exists on the external surface of the light transmission window, and
the wiper operation interval condition is a condition that detection within a predetermined second period is repeated a predetermined number of times or more, the detection being detection of decrease, to less than a predetermined decrease threshold after being improved by the wiper operation, of at least one of the measurement success or failure result and the signal-to-noise ratio.

4. The wind measurement apparatus according to claim 3, wherein
when the wiper operation interval condition is satisfied and a signal-to-noise ratio decrease condition is satisfied, the precipitation determiner determines that the precipitation exists on the external surface of the light transmission window,
the signal-to-noise ratio decrease condition is a condition that a decrease of the signal-to-noise ratio by more than a prescribed decay after being improved by a latest wiper operation is detected within a predetermined third period from a latest operation of the wiper, and
the decrease is a decrease of at least a predetermined number of the received signals out of a plurality of the received signals derived from a plurality of the reflected lights passing through a plurality of respective different portions of the light transmission window.

5. The wind measurement apparatus according to claim 4, wherein when the signal-to-noise ratio decrease condition is satisfied for a predetermined divided received signal out of divided received signals into which the received signal is divided to correspond to a plurality of divided spaces into which the space is divided by distance from the optical device, the precipitation determiner determines that the precipitation exists on the external surface of the light transmission window.

6. The wind measurement apparatus according to claim 4, wherein
when the wiper operation interval condition is satisfied and a wind direction condition is satisfied, the precipitation determiner determines that the precipitation exists on the external surface of the light transmission window, and
the wind direction condition is a condition that a vertical component of the wind velocity vector measured by the wind velocity measurer in a fourth period from a latest operation of the wiper is equal to or less than a predetermined threshold for a wind speed measured in such a way that a wind blowing downward has a negative value.

7. The wind measurement apparatus according to claim 3, wherein
when the wiper operation interval condition is satisfied and a wind direction condition is satisfied, the precipitation determiner determines that the precipitation exists on the external surface of the light transmission window, and
the wind direction condition is a condition that a vertical component of the wind velocity vector measured by the wind velocity measurer in a fourth period from a latest operation of the wiper is equal to or less than a predetermined threshold for a wind speed measured in such a way that a wind blowing downward has a negative value.

8. The wind measurement apparatus according to claim 2, wherein
for each of a plurality of divided spaces into which the space is divided by distance from the optical device, the wind velocity measurer calculates the wind velocity vector, and
a wind velocity acquisition ratio is used as at least a part of the measurement success or failure result, and the wind velocity acquisition ratio is a ratio of the number of wind velocity vectors measured in predetermined divided spaces in a predetermined latest fifth period, with respect to a total number of wind velocity vectors measured in predetermined divided spaces in the predetermined latest fifth period.

9. The wind measurement apparatus according to claim 1, wherein
when a wiper operation interval condition is satisfied, the precipitation determiner determines that the precipitation exists on the external surface of the light transmission window,
the wiper operation interval condition is a condition that detection within a predetermined second period is repeated a predetermined number of times or more, the detection being detection of decrease, to less than a predetermined decrease threshold after being improved by the wiper operation, of at least one of the measurement success or failure result and the signal-to-noise ratio.

10. The wind measurement apparatus according to claim 9, wherein
when the wiper operation interval condition is satisfied and a signal-to-noise ratio decrease condition is satisfied, the precipitation determiner determines that the precipitation exists on the external surface of the light transmission window,
the signal-to-noise ratio decrease condition is a condition that a decrease of the signal-to-noise ratio by more than a prescribed decay after being improved by a latest wiper operation is detected within a predetermined third period from a latest operation of the wiper, the decrease is a decrease of at least a predetermined number of the received signals out of a plurality of the received signals derived from a plurality of the reflected lights passing through a plurality of respective different portions of the light transmission window.

11. The wind measurement apparatus according to claim 10, wherein
when the signal-to-noise ratio decrease condition is satisfied for a predetermined divided received signal out of divided received signals into which the received signal is divided to correspond to a plurality of divided spaces into which the space is divided by distance from the optical device, the precipitation determiner determines that the precipitation exists on the external surface of the light transmission window.

12. The wind measurement apparatus according to claim 11, wherein
when the signal-to-noise ratio decrease condition is satisfied for a divided received signal out of the divided received signals that is closest to the optical device, the precipitation determiner determines that the precipitation exists on the external surface of the light transmission window.

13. The wind measurement apparatus according to claim 10, wherein
when the wiper operation interval condition is satisfied and a wind direction condition is satisfied, the precipitation determiner determines that the precipitation exists on the external surface of the light transmission window, and
the wind direction condition is a condition that a vertical component of the wind velocity vector measured by the wind velocity measurer in a fourth period from a latest operation of the wiper is equal to or less than a predetermined threshold for a wind speed measured in such a way that a wind blowing downward has a negative value.

14. The wind measurement apparatus according to claim 10, wherein
for each of a plurality of divided spaces into which the space is divided by distance from the optical device, the wind velocity measurer calculates the wind velocity vector, and
a wind velocity acquisition ratio is used as at least a part of the measurement success or failure result, and the wind velocity acquisition ratio is a ratio of the number of wind velocity vectors measured in predetermined divided spaces in a predetermined latest fifth period, with respect to a total number of wind velocity vectors measured in predetermined divided spaces in the predetermined latest fifth period.

15. The wind measurement apparatus according to claim 9, wherein
when the wiper operation interval condition is satisfied and a wind direction condition is satisfied, the precipitation determiner determines that the precipitation exists on the external surface of the light transmission window,
the wind direction condition is a condition that a vertical component of the wind velocity vector measured by the wind velocity measurer in a fourth period from a latest operation of the wiper is equal to or less than a predetermined threshold for a wind speed measured in such a way that a wind blowing downward has a negative value.

16. The wind measurement apparatus according to claim 15, wherein
when the wind direction condition is satisfied by the vertical component of the wind velocity vector measured by the wind velocity measurer for the first time after the latest operation of the wiper, the precipitation determiner determines that the precipitation exists on the external surface of the light transmission window.

17. The wind measurement apparatus according to claim 9, wherein
for each of a plurality of divided spaces into which the space is divided by distance from the optical device, the wind velocity measurer calculates the wind velocity vector, and
a wind velocity acquisition ratio is used as at least a part of the measurement success or failure result, and the wind velocity acquisition ratio is a ratio of the number of wind velocity vectors measured in predetermined divided spaces in a predetermined latest fifth period, with respect to a total number of wind velocity vectors measured in predetermined divided spaces in the predetermined latest fifth period.

18. The wind measurement apparatus according to claim 1, wherein
for each of a plurality of divided spaces into which the space is divided by distance from the optical device, the wind velocity measurer calculates the wind velocity vector, and
a wind velocity acquisition ratio is used as at least a part of the measurement success or failure result, and the wind velocity acquisition ratio is a ratio of the number of wind velocity vectors measured in predetermined divided spaces in a predetermined latest fifth period, with respect to a total number of wind velocity vectors measured in predetermined divided spaces in the predetermined latest fifth period.

19. A lidar apparatus comprising:
an optical device to emit a laser light into a space and to process a reflected light being the laser light reflected from the space;
a casing to house the optical device;
a light transmission window provided in the casing and to transmit the laser light and the reflected light;
a wiper to remove foreign matter existing on an external surface of the light transmission window;
a washer fluid supplier to supply a washer fluid to the external surface of the light transmission window;
a signal processor to process a received signal obtained by photoelectric conversion of the reflected light;
a signal-to-noise ratio calculator to calculate a signal-to-noise ratio of the received signal;
a foreign matter detector to detect, based on the signal-to-noise ratio, the foreign matter existing on the external surface of the light transmission window, the foreign matter hindering the laser light and the reflected light from passing through the light transmission window;
a precipitation determiner to determine
whether precipitation, included in the foreign matter, exists on the external surface of the light transmission window based on a time elapsed since the latest wiper operation, when the foreign matter detector detects the foreign matter, and
that the precipitation does not exist, when the foreign matter detector does not detect the foreign matter; and
a wiper operation controller to cause
the wiper to operate and the washer fluid supplier not to operate, when the precipitation determiner determines that the precipitation exists, and
the washer fluid supplier and the wiper to operate, when the precipitation determiner does not determine that the precipitation exists and the foreign matter detector detects that the foreign matter exists.

20. The lidar apparatus according to claim 19, wherein when the wiper operation controller causes the wiper to operate and the washer fluid supplier not to operate and thereafter the signal-to-noise ratio does not become equal to or higher than a predetermined improvement determining threshold, the wiper operation controller causes the washer fluid supplier and the wiper to operate.

* * * * *